US 6,498,521 B1

(12) United States Patent
Bicakci et al.

(10) Patent No.: US 6,498,521 B1
(45) Date of Patent: Dec. 24, 2002

(54) DYNAMIC SUPPLY CONTROL FOR LINE DRIVER

(75) Inventors: Ara Bicakci, San Jose, CA (US); Sang-Soo Lee, Cupertino, CA (US); Cormac S. Conroy, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/998,671

(22) Filed: Nov. 29, 2001

(51) Int. Cl.[7] .............................. H03B 1/00; H03K 3/00
(52) U.S. Cl. ........................................ 327/110; 327/309
(58) Field of Search ............................ 327/51, 52, 63, 327/64, 69, 78, 90, 108, 110, 309, 312, 314, 318, 320, 321

(56) References Cited

U.S. PATENT DOCUMENTS

| 4,466,107 A | * | 8/1984 | Stoner ........................ 327/558 |
| 5,909,135 A | * | 6/1999 | Baldwin et al. ............ 327/110 |
| 6,275,078 B1 | * | 8/2001 | Zabroda ..................... 327/108 |
| 6,411,136 B1 | * | 6/2002 | Nianxiong et al. ........... 326/30 |

* cited by examiner

Primary Examiner—My-Trang Nu Ton
(74) Attorney, Agent, or Firm—Thelen, Reid & Priest LLP

(57) ABSTRACT

A dynamic supply control circuit is provided for a line driver. The line driver has an amplification factor G, receives an input signal voltage, and drives a transmission line having a load $R_L$ via a transformer having a turns ratio of 1:n. The circuit includes an input node for receiving an input signal voltage, a supply node for supplying a driving voltage to the line driver, a lift diode coupled between a fixed supply voltage and the supply node, a lift capacitor coupled between the supply node and an output node, and a lift amplifier having the amplification factor G coupled between the input node and the output node. The lift amplifier drives the lift capacitor when the input signal voltage is greater than an input threshold voltage, the input threshold voltage having a value greater than a common mode voltage of the input signal voltage.

80 Claims, 19 Drawing Sheets

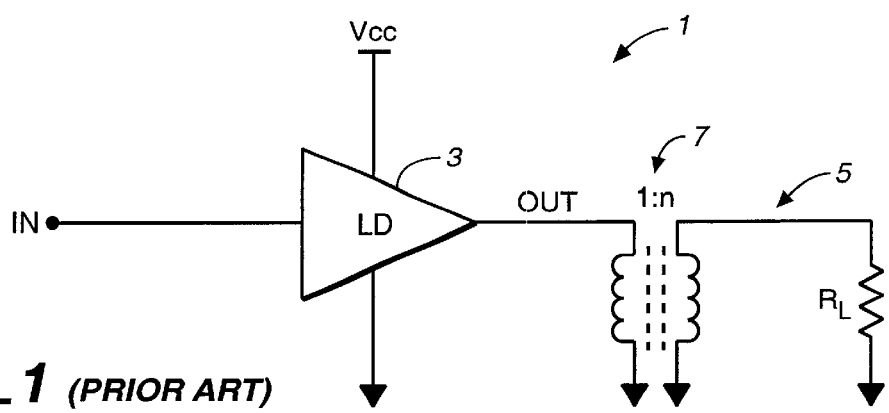
FIG._1 (PRIOR ART)
FIG._2 High PAR DMT pattern
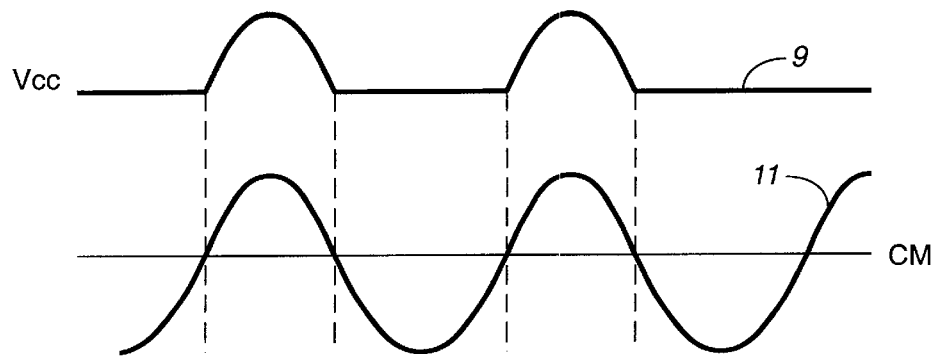
FIG._3 (PRIOR ART)

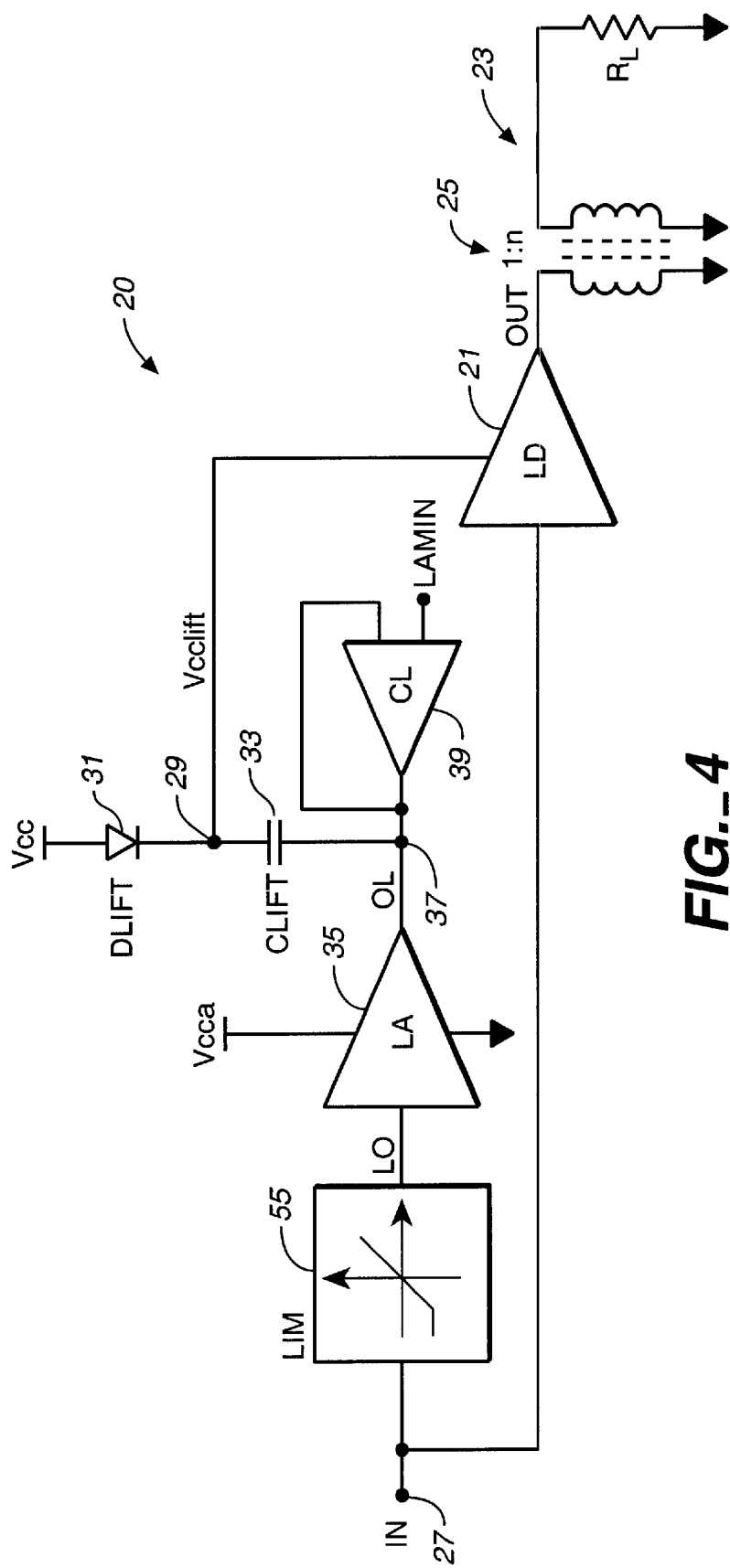
FIG._4

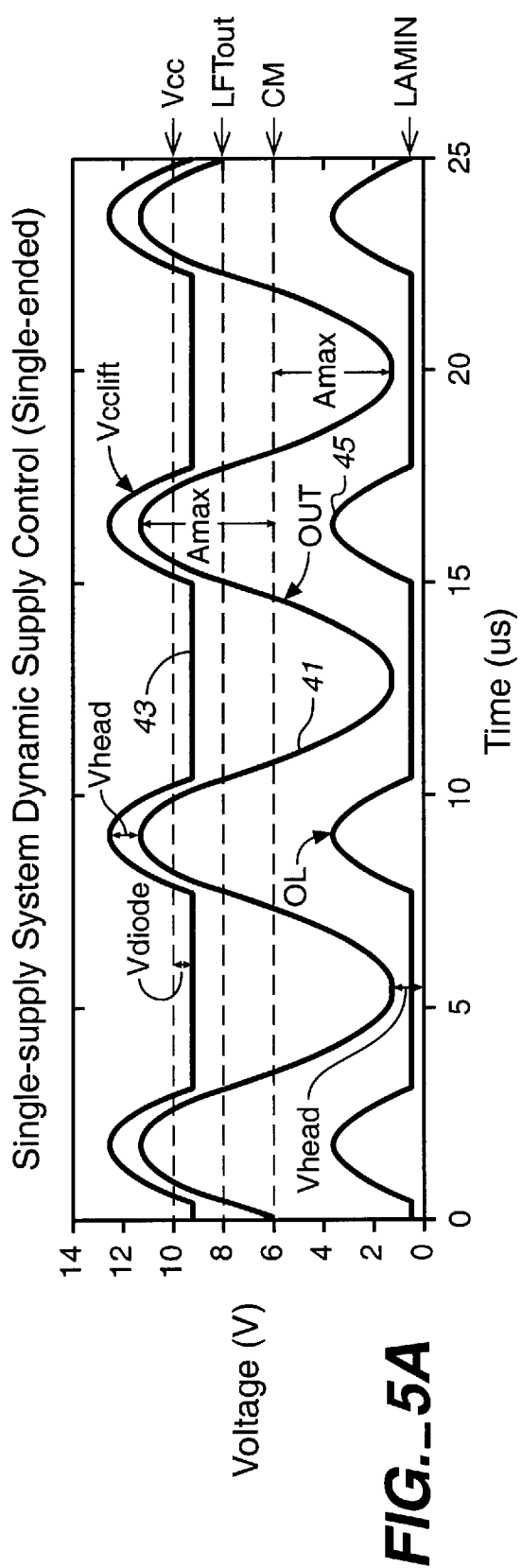
FIG._5A
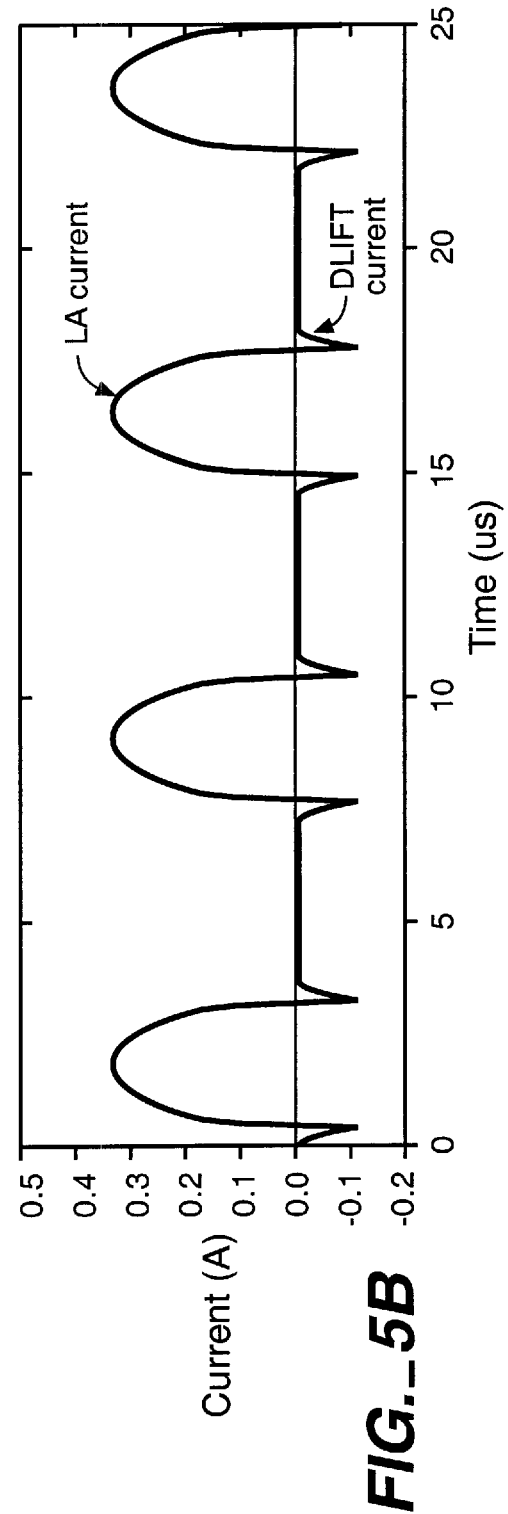
FIG._5B

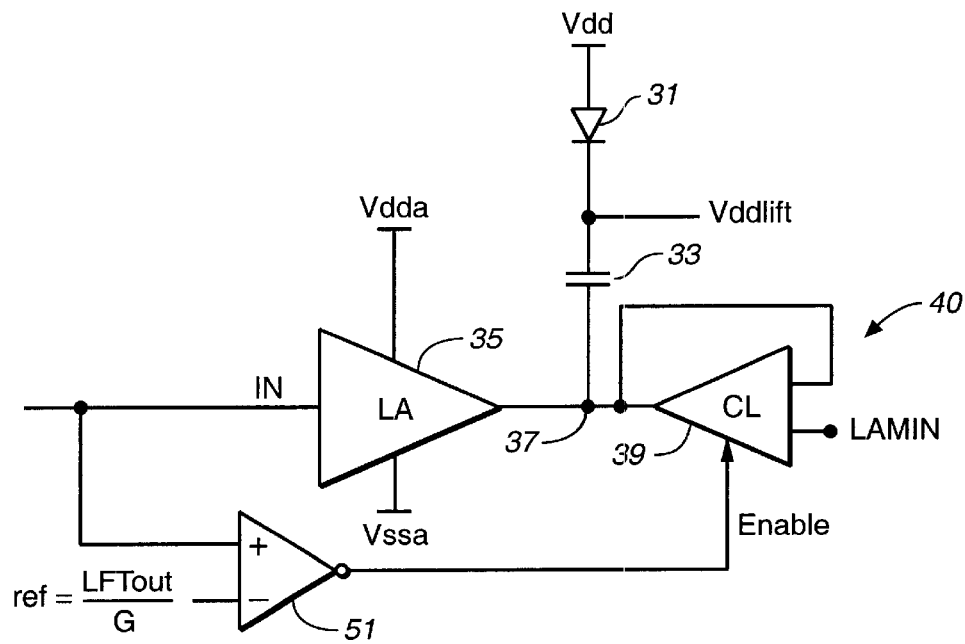
FIG._6
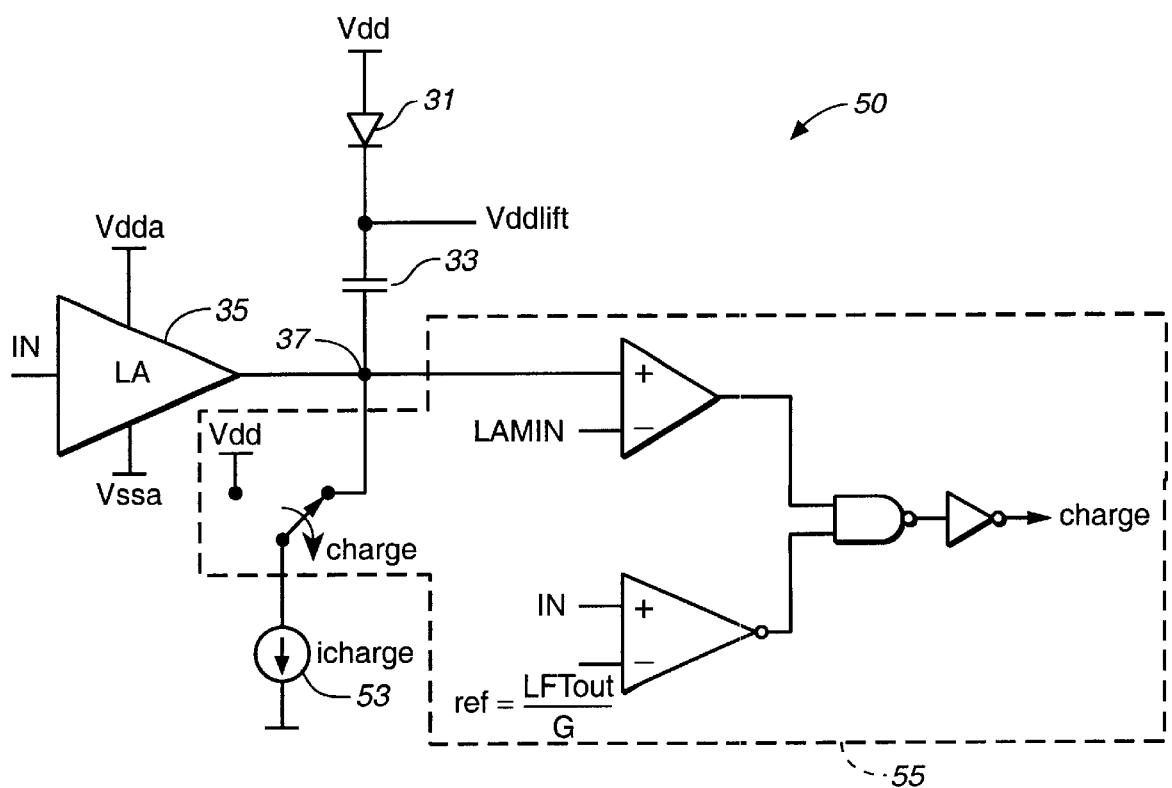
FIG._7

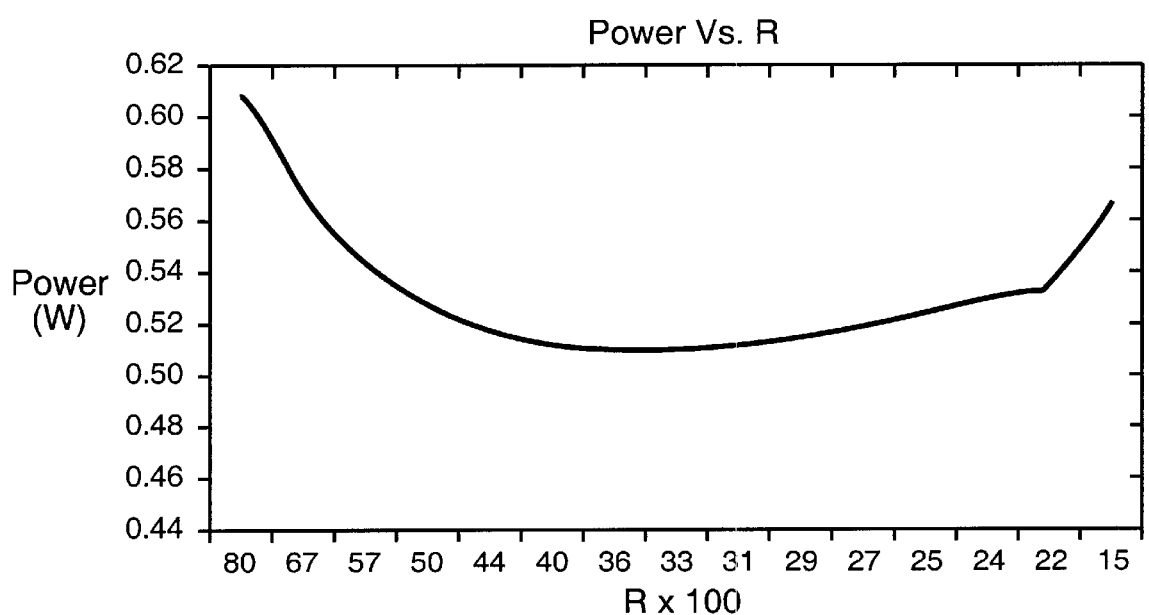
FIG._8

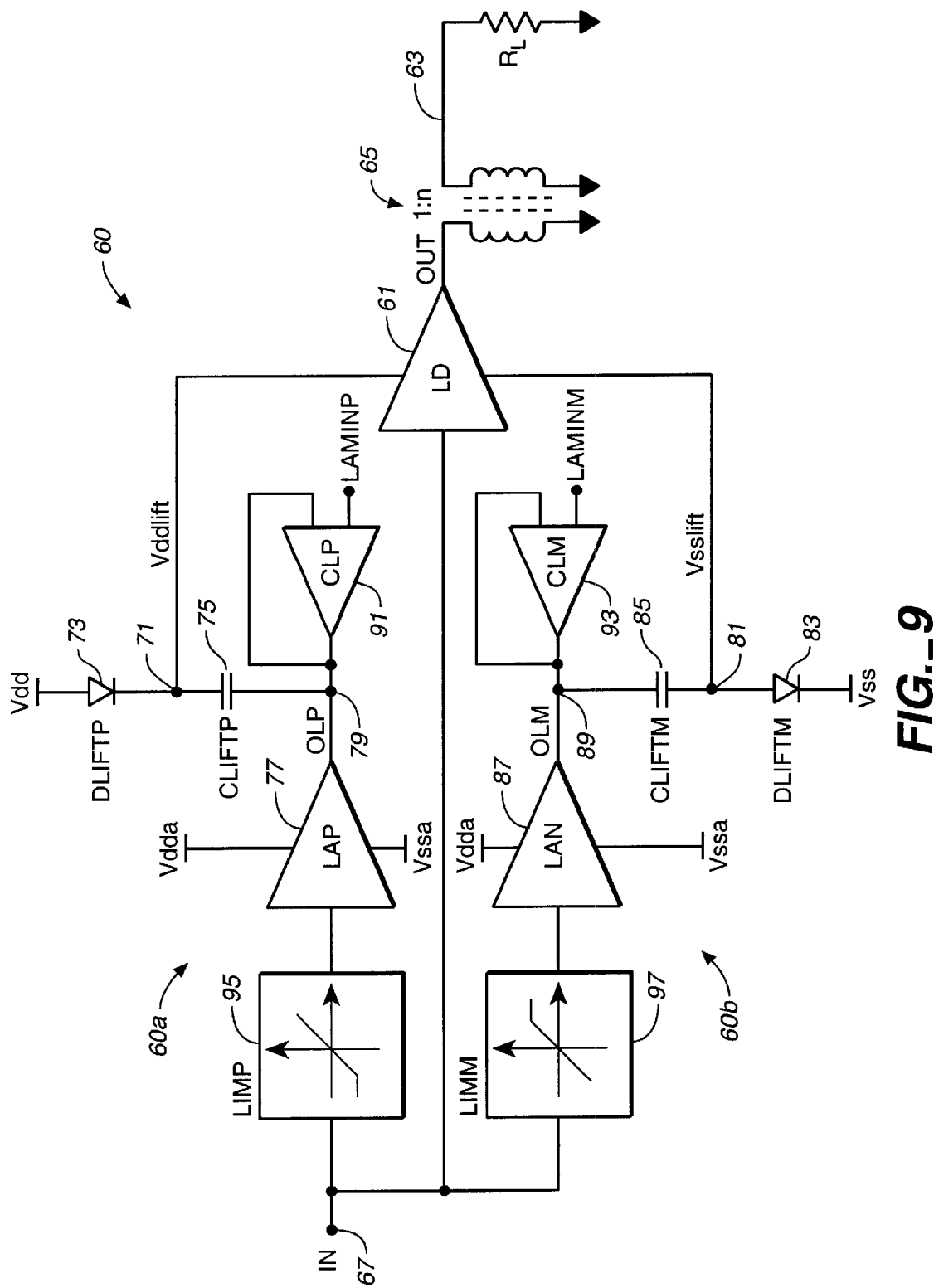
FIG._9

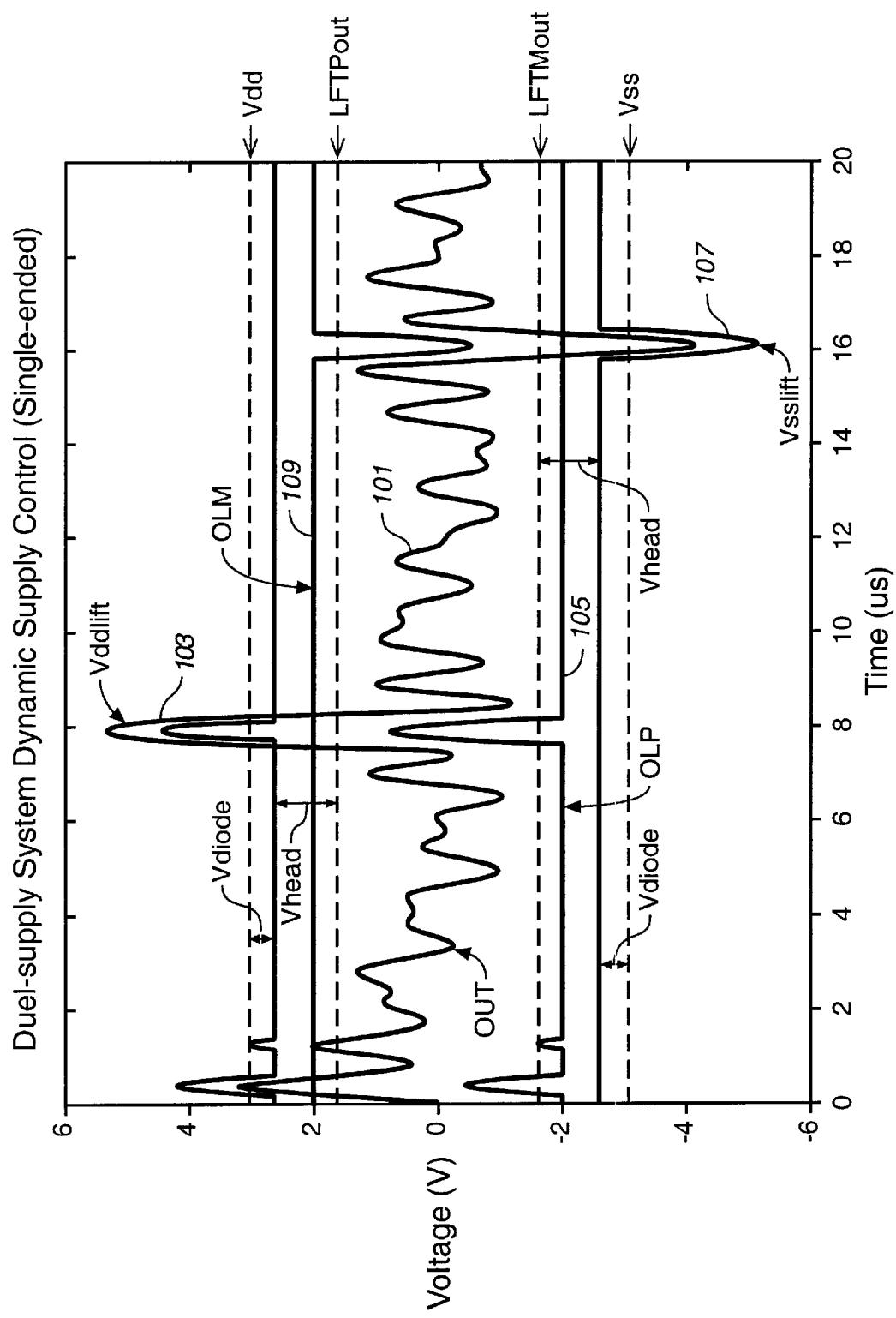
FIG._10

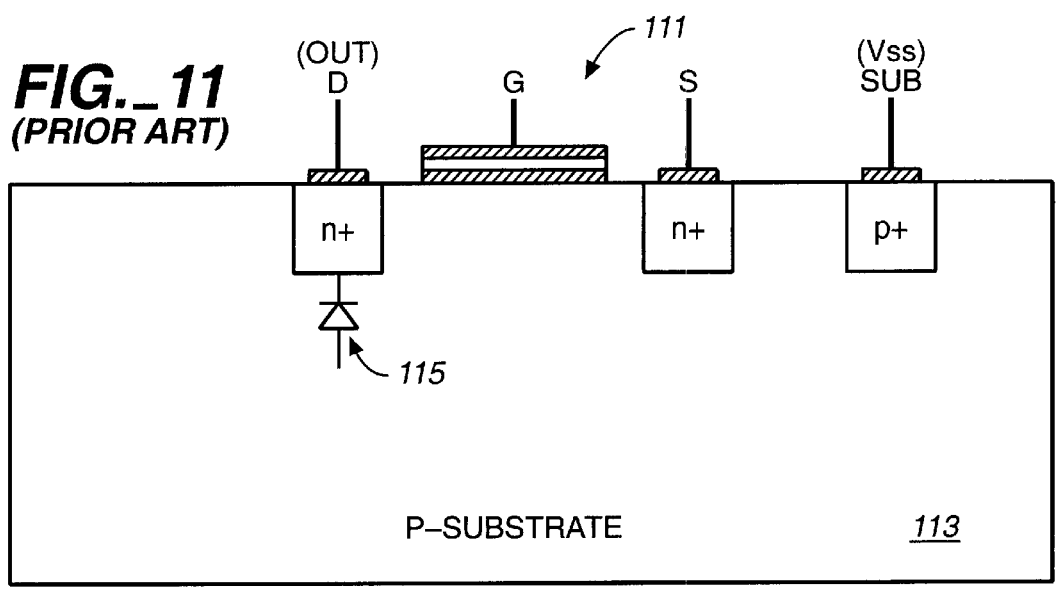
FIG._11
(PRIOR ART)
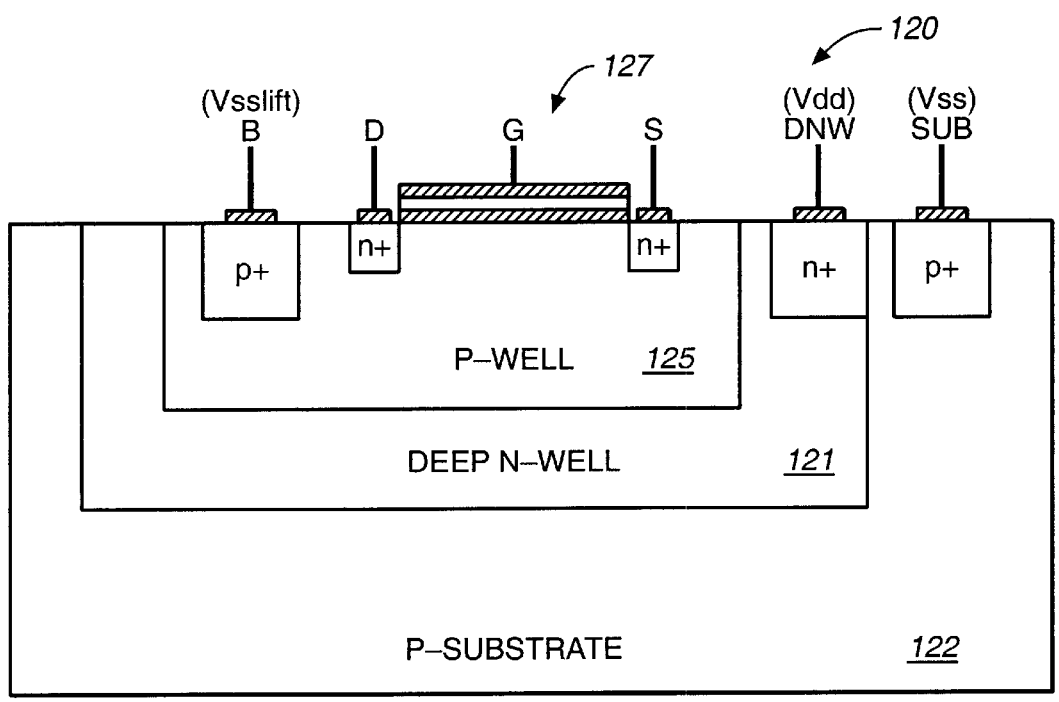
FIG._12A
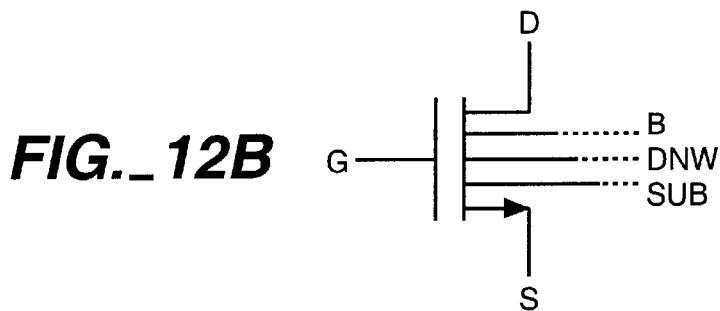
FIG._12B

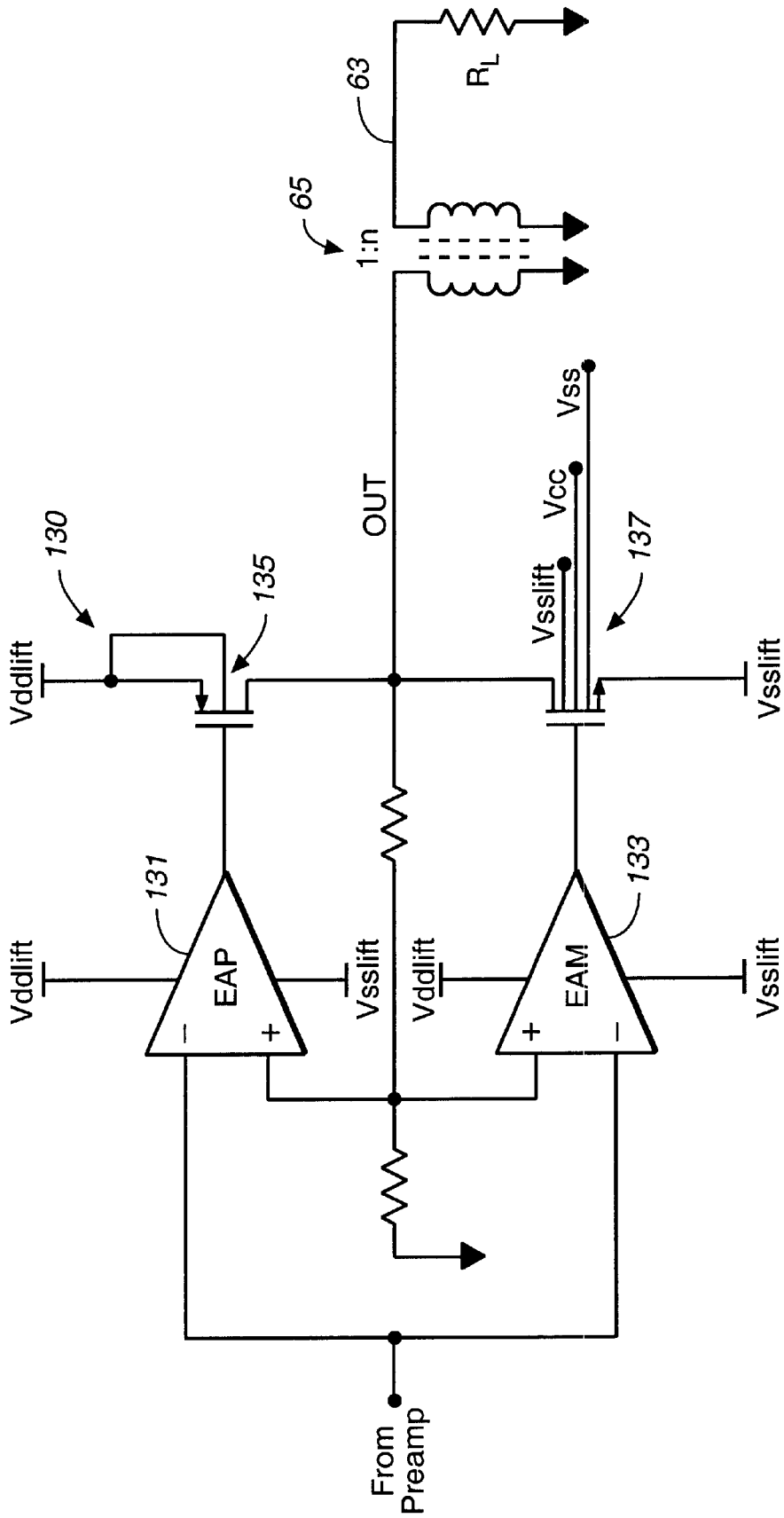
FIG._13

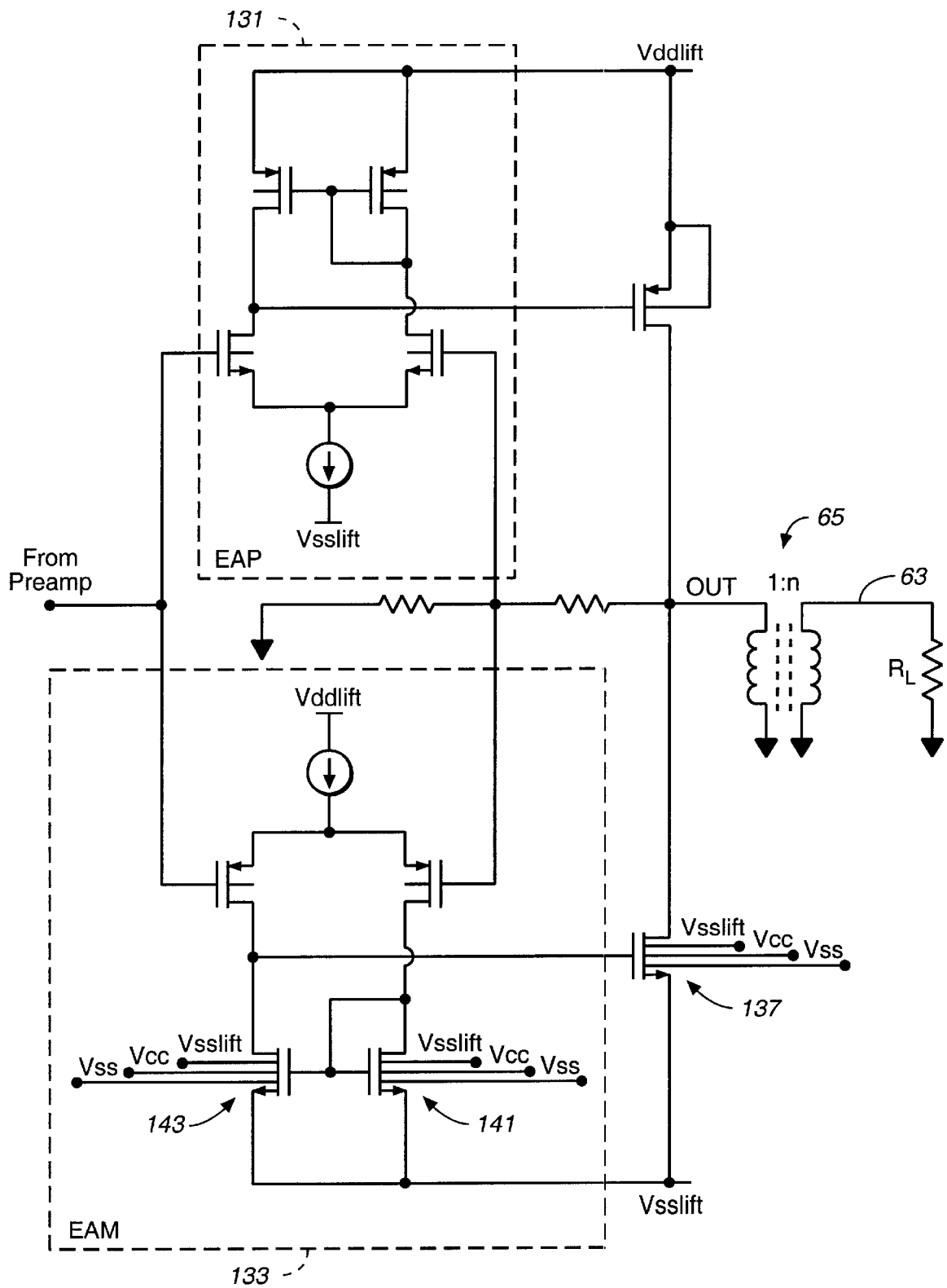
FIG._14

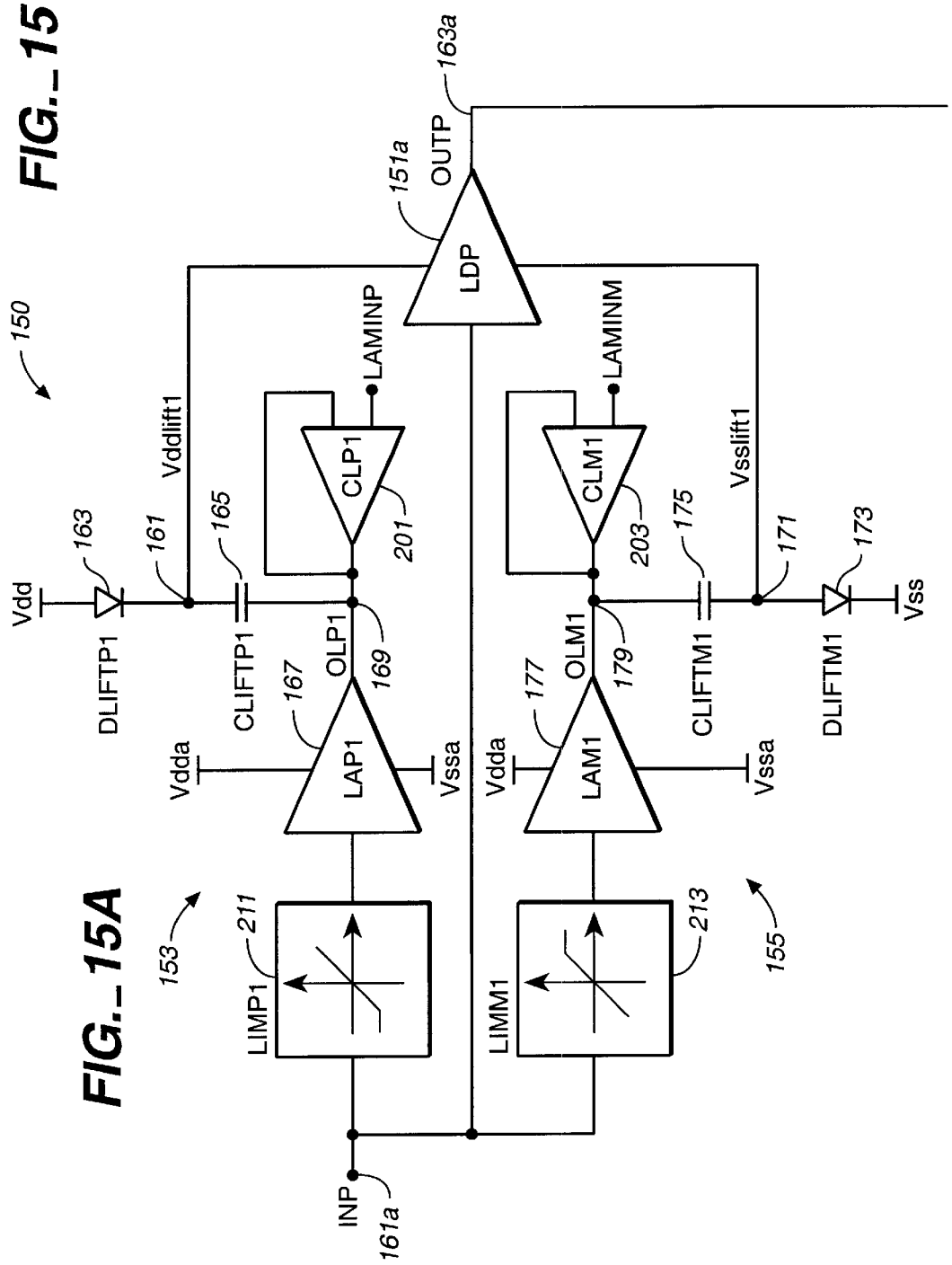

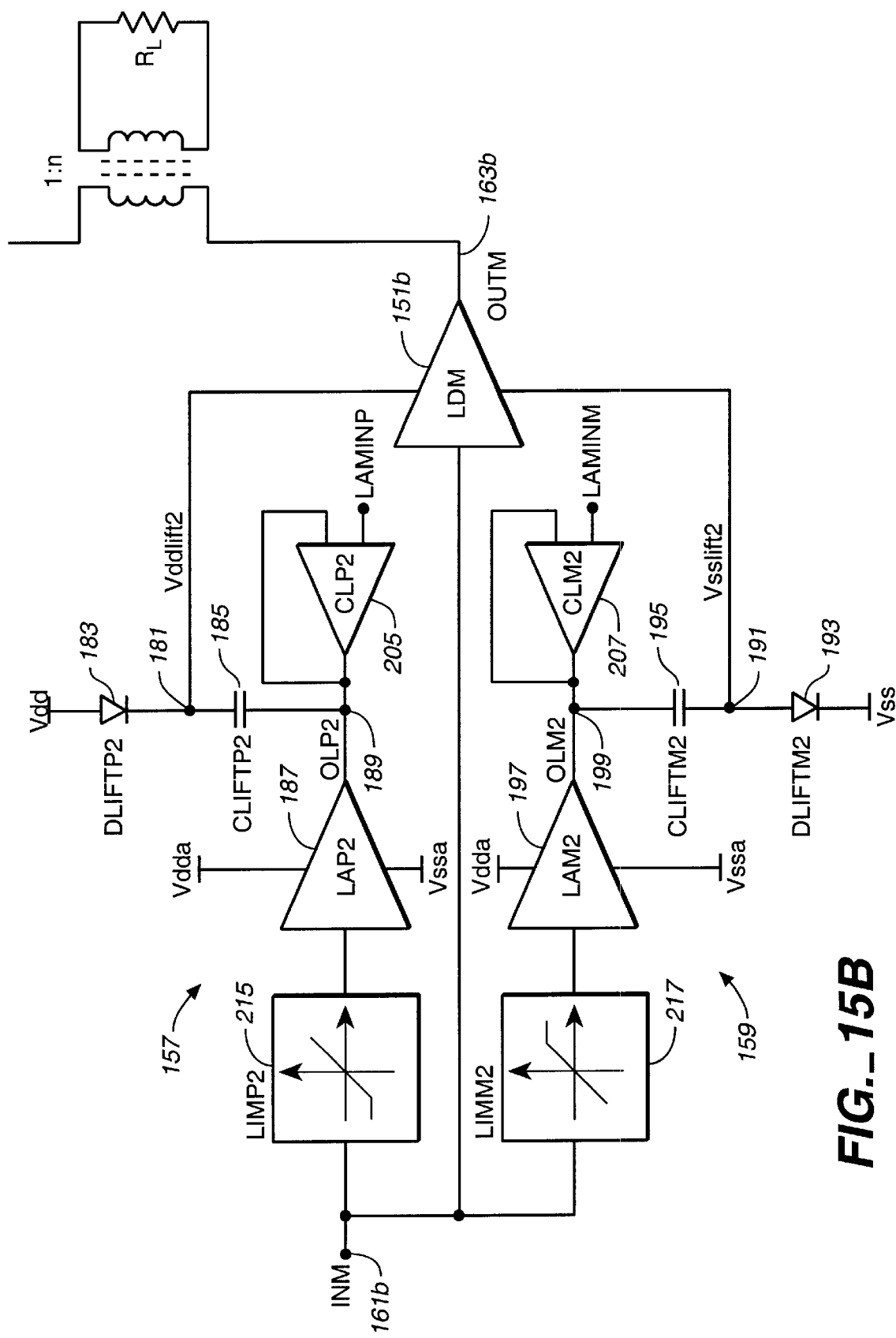
FIG._15B

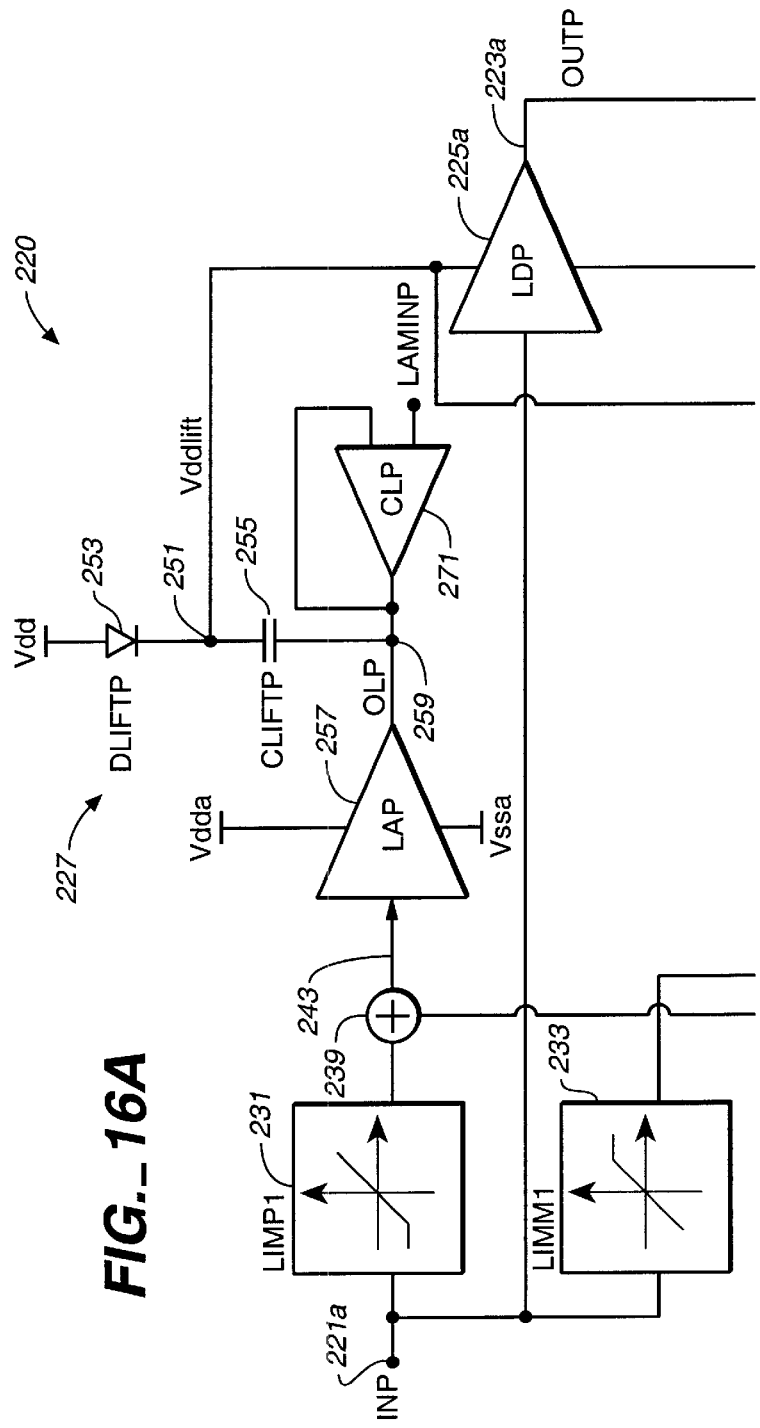
FIG._16
FIG._16A

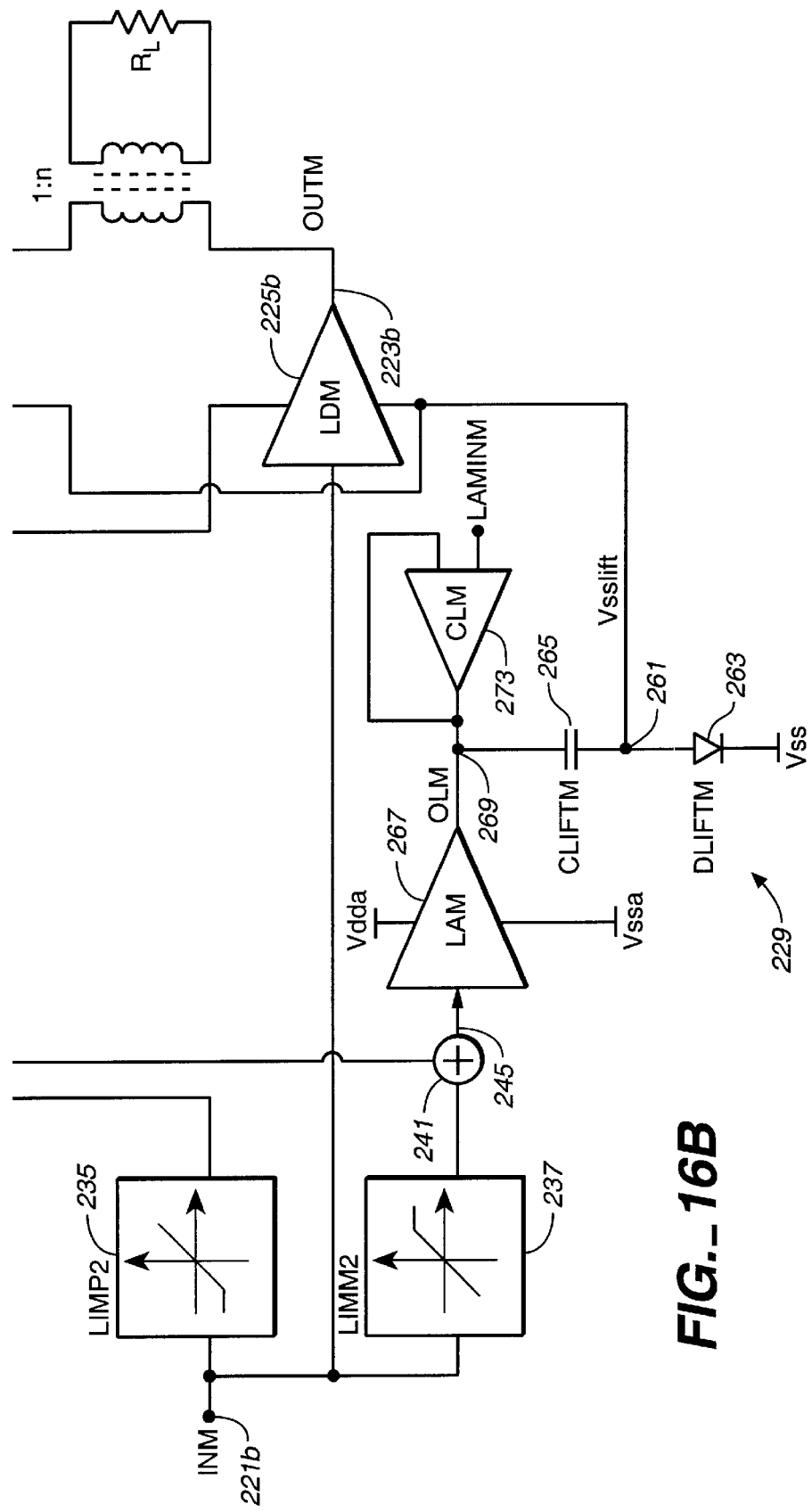
FIG._16B

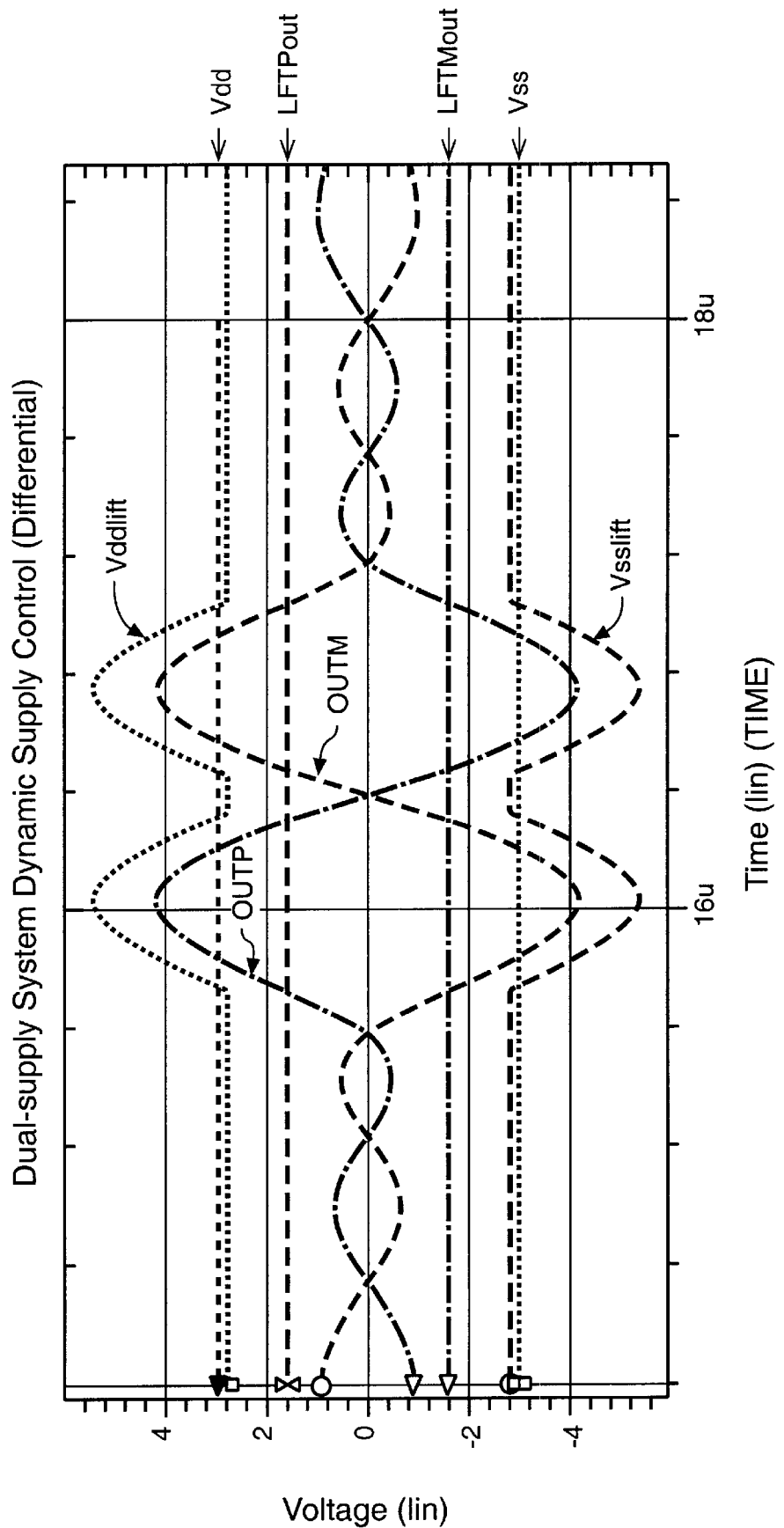
FIG._17A

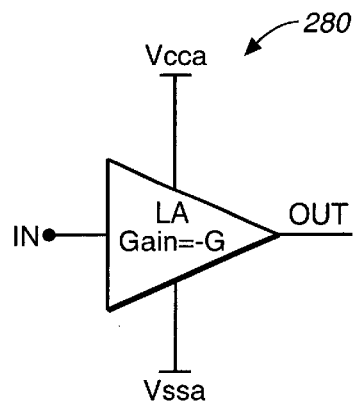
FIG._18A
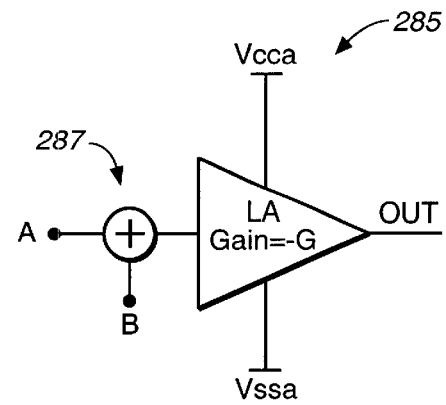
FIG._19A
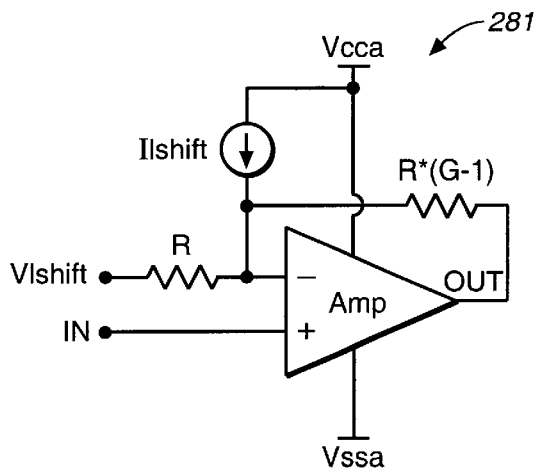
FIG._18B
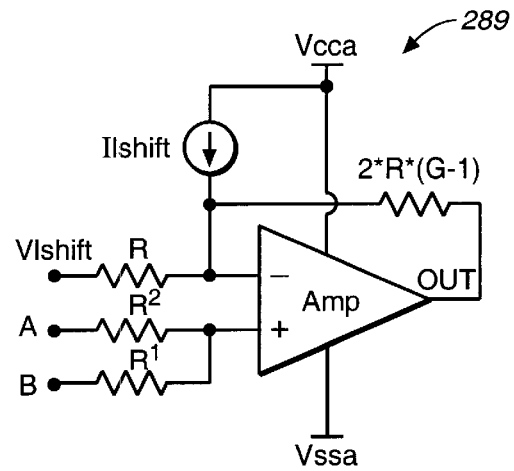
FIG._19B
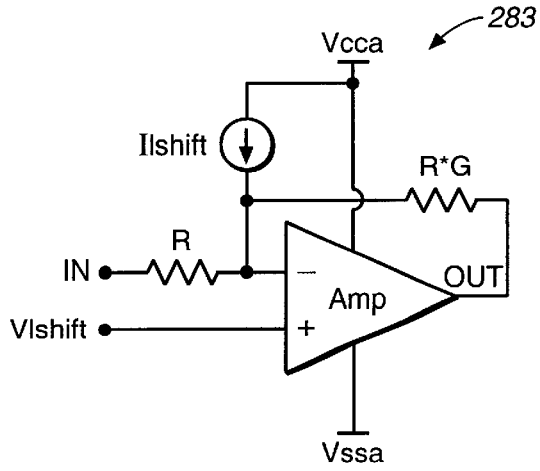
FIG._18C
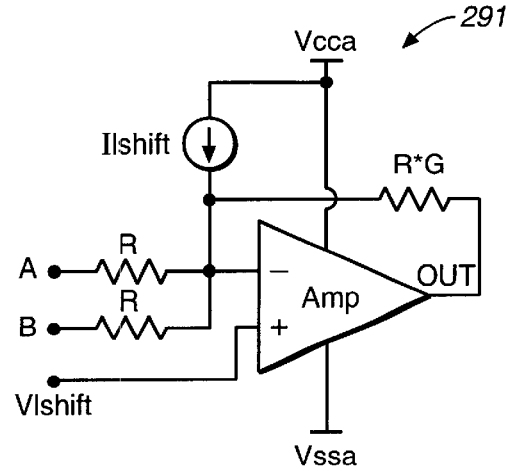
FIG._19C

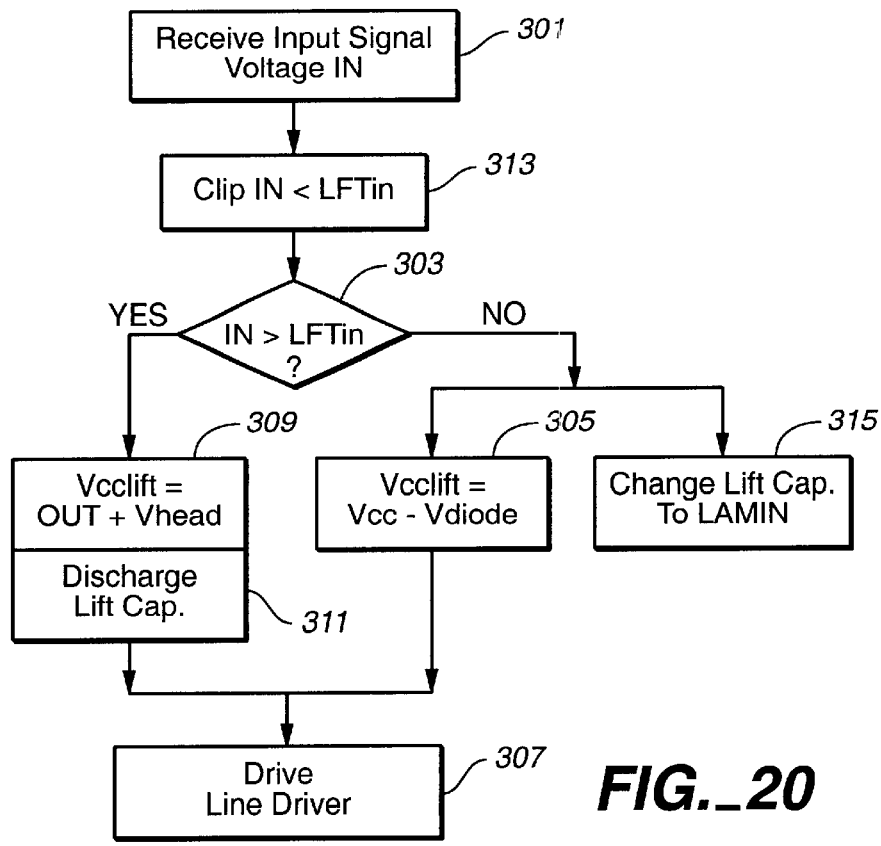
FIG._20
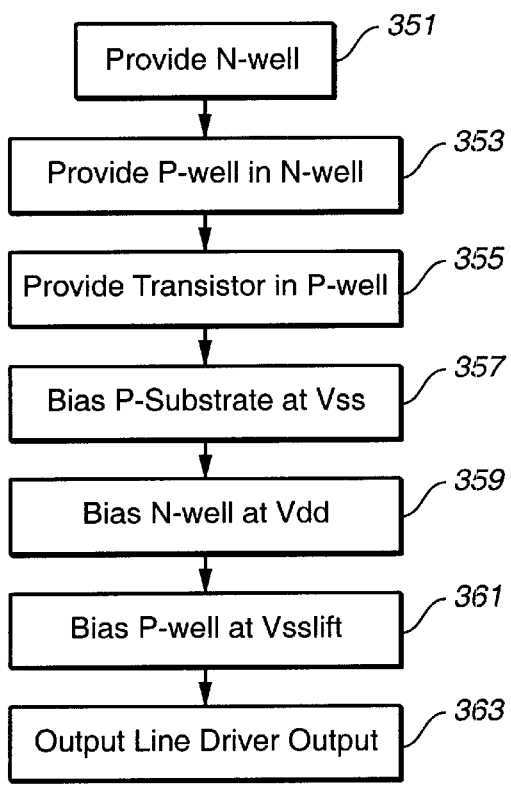
FIG._22

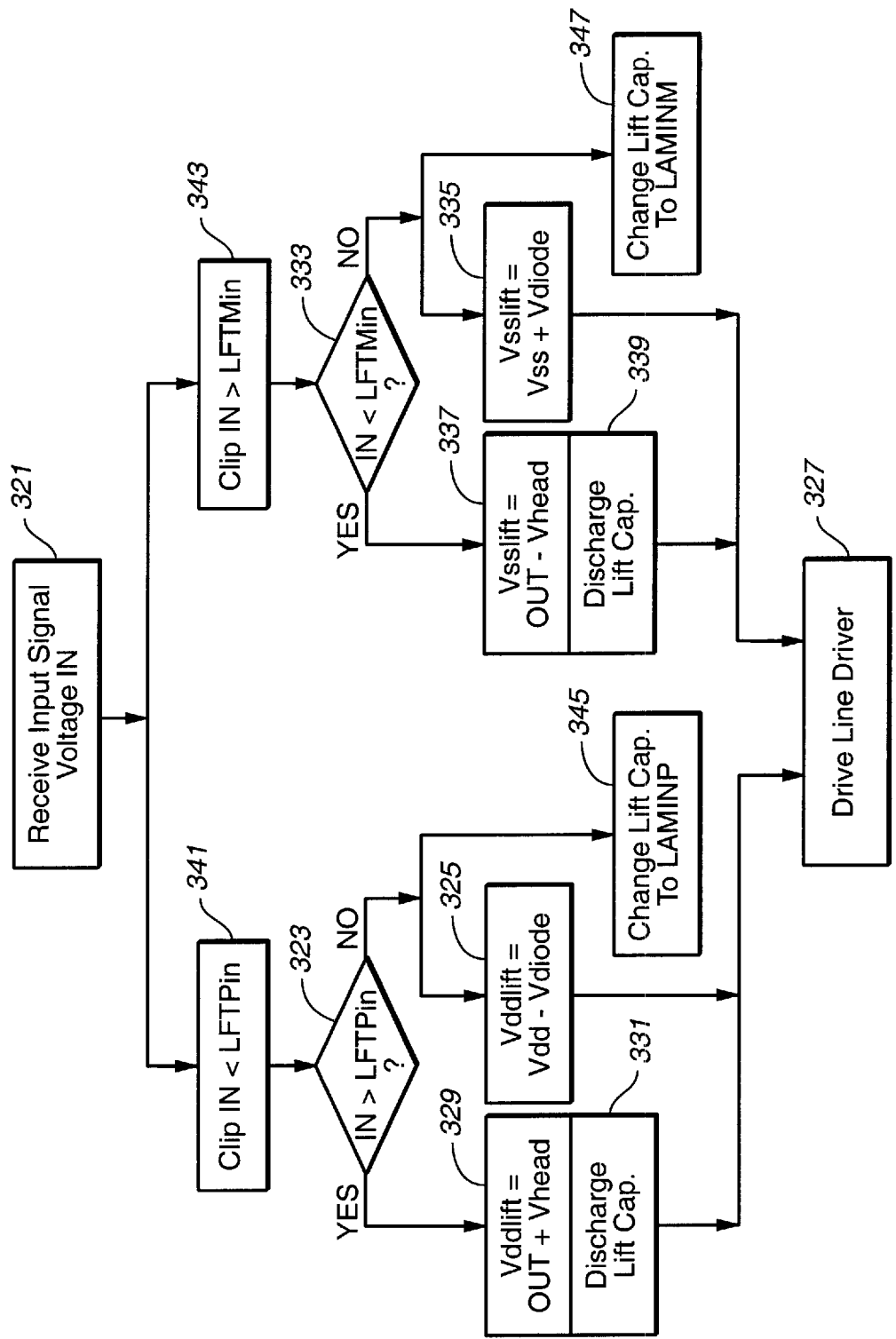
FIG._21

US 6,498,521 B1

DYNAMIC SUPPLY CONTROL FOR LINE DRIVER

FIELD OF THE INVENTION

The present invention relates to digital subscriber line (DSL) technologies. More particularly, the present invention relates to a dynamic supply control for a line driver for use with digital subscriber line (DSL) and asymmetrical digital subscriber line (ADSL) systems.

BACKGROUND OF THE INVENTION

FIG. 1 schematically illustrates a conventional line driver system 1 with a single-ended line driver (LD) 3. The line driver 3 is supplied with a fixed supply voltage $V_{cc}$ and drives a transmission line 5 with a load $R_L$ through a transformer 7 having a turns ratio of 1:n. In the traditional line driver system 1, in order to prevent clipping of an output signal, the fixed supply voltage $V_{cc}$ is chosen high enough to handle the highest signal peak of an input signal. Discrete Multitone (DMT) signals are commonly used in DSL and ADSL systems, and the associated waveforms exhibit a high Peak-to-Average Ratio (PAR).

FIG. 2 illustrates a typical waveform of a DMT signal. As shown in FIG. 2, however, the DMT signal amplitude is relatively small for most of the time, and very high peaks occur only occasionally. However, in the conventional line driver system 1, the line driver 3 must be always supplied with a high supply voltage higher than the highest peak expected. Since the average power consumption of the line driver 3 is substantially given by the average of (fixed supply voltage)×(line driver current), a high supply voltage increases the power consumption of the line driver system 1. In other words, a fixed high supply voltage, which is actually needed only during occasional high peaks, results in wasting the valuable system power.

Using a Class-G amplifier for a line driver is one possible solution, which provides a dynamic supply control scheme so as to reduce the line driver power consumption. A Class-G amplifier basically employs switching between a low supply voltage and a high supply voltage based on the output signal strength. However, the Class-G scheme requires an extra voltage supply, and switching between two supply voltages introduces glitches and creates high frequency harmonics. Such glitches and high frequency harmonics are difficult eliminate, and/or require additional circuitry to reduce the undesirable effects. Therefore, this Class-G approach is less attractive in view of both performance and cost.

A Class-H high-output voltage level line driver can provide an output voltage swing larger than the supply voltage. FIG. 3 schematically illustrates a supply voltage 9 and an output signal 11 of a conventional Class-H high-output voltage line driver for audio signals (up to 20 kHz). The conventional Class-H line driver typically operates as a non-inverting amplifier with a single-ended output. As shown in FIG. 3, in order to provide a higher output voltage, the supply voltage 9 is lifted as soon as the line driver output voltage 11 increases above-the DC output level (common mode voltage level CM). However, although the conventional high-output voltage level line driver allows reducing the gain of the amplifier and may increase the signal-to-noise ratio, lifting the supply voltage whenever the input audio signal crosses the common mode voltage level is not optimum to save the power of the line driver.

Accordingly, it would be desirable to provide a line driver circuit for DSL/ADSL applications with reduced power consumption without increasing the cost or complexity of the circuitry.

BRIEF DESCRIPTION OF THE INVENTION

A dynamic supply control circuit is provided for a line driver. The line driver has an amplification factor G, receives an input signal voltage, and drives a transmission line having a load $R_L$ via a transformer having a turns ratio of 1:n. The circuit includes an input node for receiving an input signal voltage, a supply node for supplying a driving voltage to the line driver, a lift diode coupled between a fixed supply voltage and the supply node, a lift capacitor coupled between the supply node and an output node, and a lift amplifier having the amplification factor G coupled between the input node and the output node. The lift amplifier drives the lift capacitor when the input signal voltage is greater than an input threshold voltage, the input threshold voltage having a value greater than a common mode voltage of the input signal voltage.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1 is a schematic electrical diagram illustrating a conventional line driver system including a single-ended line driver.

FIG. 2 is a diagram schematically illustrating a typical waveform of a DMT signal having a high Peak to Average Ratio.

FIG. 3 is a diagram schematically illustrating waveforms of a supply voltage and an output signal voltage of a line driver in a conventional high-output voltage line driver system.

FIG. 4 is an electrical diagram schematically illustrating a dynamic supply control circuit for a line driver in accordance with an embodiment of the present invention.

FIG. 5A is a diagram schematically illustrating the waveforms of a line driver output (OUT), a driving voltage $V_{cclift}$, and a lift amplifier output (OL) in accordance with one embodiment of the present invention.

FIG. 5B is a diagram schematically illustrating a current provided from the lift amplifier and the lift diode corresponding to the driving voltage $V_{cclift}$ shown in FIG. 5A.

FIG. 6 is an electrical diagram schematically illustrating an example of a charger circuit including a clamp circuit and an enable circuit in accordance with one embodiment of the present invention.

FIG. 7 is an electrical diagram schematically illustrating a charger circuit in accordance with another embodiment of the present invention.

FIG. 8 is a diagram schematically illustrating an example of the simulation result indicating an optimum lifting point minimizing the system power consumption in accordance with one embodiment of the present invention.

FIG. 9 is an electrical diagram schematically illustrating a line driver circuit having a dynamic supply control circuit with a dual-supply system in accordance with one embodiment of the present invention.

FIG. 10 is a diagram schematically illustrating the waveforms of a line driver output (OUT), a positive driving voltage $V_{ddlift}$, a first lift amplifier output (OLP), a negative driving voltage $V_{sslift}$, and a second lift amplifier output (OLM).

FIG. 11 is a diagram schematically illustrating a conventional IC chip structure in which an output device (n-type transistor) of the line driver is formed on a substrate.

FIG. 12A is a diagram schematically illustrating a semiconductor structure having a deep N-well in accordance with one embodiment of the present invention.

FIG. 12B is an equivalent circuit diagram of the semiconductor structure shown in FIG. 12A.

FIG. 13 is an electrical diagram schematically illustrating an output stage of the line driver shown in FIG. 9.

FIG. 14 is a schematic electrical diagram illustrating the negative side of the output stage shown in FIG. 13.

FIG. 15 is an electrical diagram schematically illustrating one example of a differential implementation of the line driver circuit in accordance with one embodiment of the present invention.

FIG. 16 is an electrical diagram schematically illustrating another example of a differential implementation of the line driver circuit in accordance with one embodiment of the present invention.

FIG. 17A is a diagram schematically illustrating the waveforms of the positive and negative driving voltages $V_{ddlift}$ and $V_{sslift}$ with respect to the first and second line driver outputs (OUTP and OUTM), shown in FIG. 16.

FIG. 18A is a schematic electrical diagram illustrating a lift amplifier having an amplification factor G with a dual supply system.

FIG. 18B is an electrical diagram schematically illustrating an example of a non-inverting type implementation of the lift amplifier shown in FIG. 18A.

FIG. 18C is an electrical diagram schematically illustrating an example of an inverting type implementation of the lift amplifier shown in FIG. 18A.

FIG. 19A is a schematic electrical diagram illustrating a lift amplifier and an adder.

FIG. 19B is an electrical diagram schematically illustrating an example of a non-inverting type implementation of the combination of the lift amplifier and the adder shown in FIG. 19A.

FIG. 19C is an electrical diagram schematically illustrating an example of an inverting type implementation of the combination of the lift amplifier and the adder shown in FIG. 19A.

FIG. 20 is a process flow diagram schematically illustrating a method for dynamically controlling a supply voltage for a line driver in accordance with one embodiment of the present invention.

FIG. 21 is a process flow diagram schematically illustrating a method for dynamically controlling a dual-supply voltage for a line driver in accordance with one embodiment of the present invention.

FIG. 22 is a process flow diagram schematically illustrating a method for biasing a specific well structure of an output stage of the line driver in accordance with one embodiment of the present invention.

DETAILED DESCRIPTION

Figure 17B:
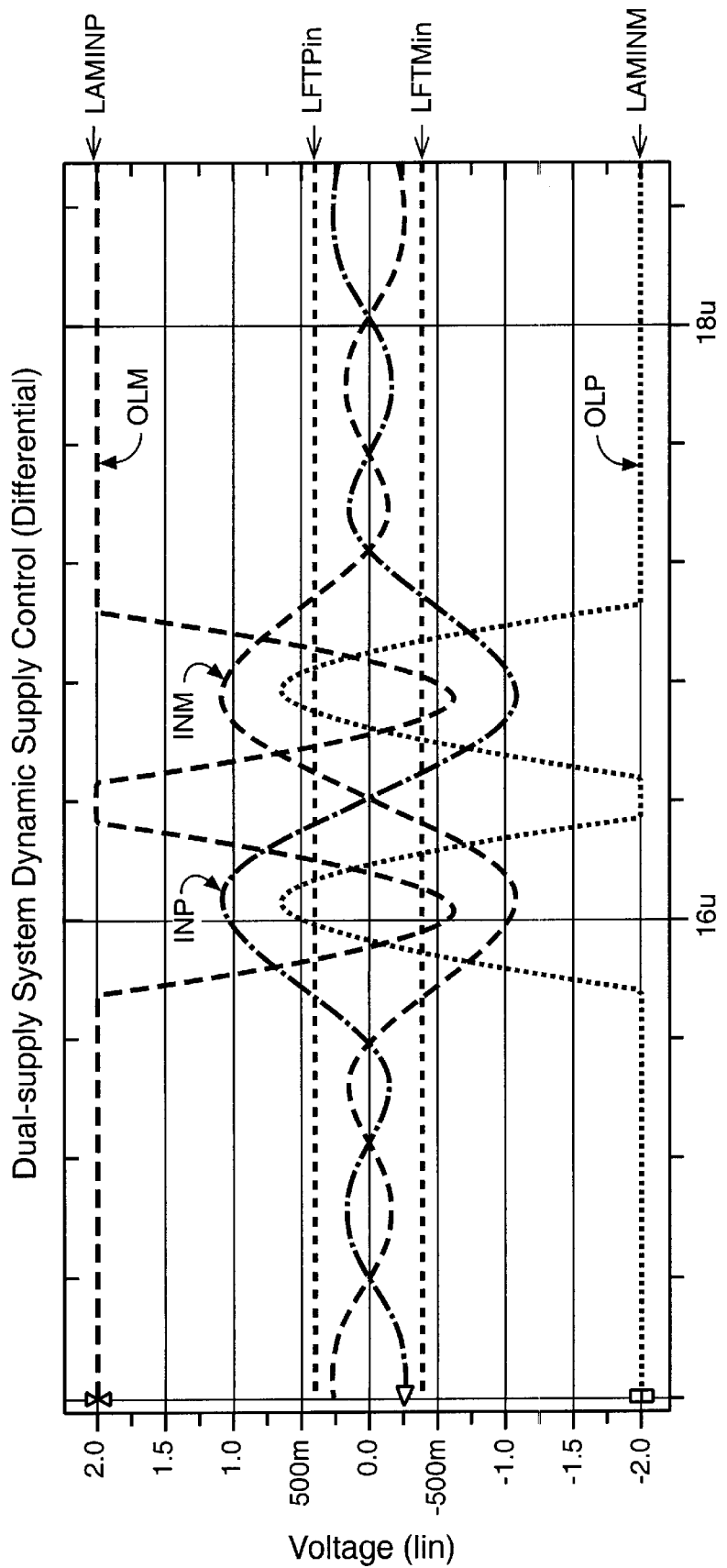
FIG. 17B is a diagram schematically illustrating the waveforms of the output (OLP) of the first lift amplifier and the output (OLM) of the second lift amplifier with respect to the first and second input signal voltages (INP and INM), shown in FIG. 16.

Embodiments of the present invention are described herein in the context of a dynamic supply control for a line driver. Those of ordinary skilled in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

FIG. 4 schematically illustrates a dynamic supply control circuit 20 for a line driver in accordance with an embodiment of the present invention. The line driver (LD) 21 has an amplification factor (gain) G and drives a transmission line 23 having a load $R_L$ via a transformer 25 having a turns ratio of 1:n. The dynamic supply control circuit 20 includes an input node 27 for receiving an input signal voltage (IN), a supply node 29 for supplying a driving voltage (i.e., line driver supply voltage) $V_{cclift}$ to the line driver 21, a lift diode (DLIFT) 31, a lift capacitor (CLIFT) 33, and a lift amplifier (LA) 35. The line driver 21 is also coupled to the input node 27 and receives the input signal voltage.

The lift diode 31 is coupled between a fixed supply voltage $V_{cc}$ and the supply node 29, and the lift capacitor 33 is coupled between the supply-node 29 and an output node 37. The lift amplifier 35 is coupled between the input node 27 and the output node 37 (through an optional limiter circuit 55). The lift amplifier 35 is configured as a gain stage with an amplification factor (gain) G, which is the same as that of the line driver 21. The lift amplifier 35 is also designed to have the same delay as the line driver 21. The lift amplifier 35 is supplied with a lift amplifier supply voltage $V_{cca}$ which is typically equal to the fixed voltage $V_{cc}$. However, since the output of the lift amplifier 35 only needs to provide an extra voltage for a portion of the line driver output, namely, (Amax×(1−R)), the lift amplifier supply voltage $V_{cca}$ may be chosen to be less than the fixed supply voltage $V_{cc}$. This saves some power of the system though an extra power supply is required.

The lift amplifier 35 drives the lift capacitor 33 when the input signal voltage is greater than an input threshold voltage $LFT_{in}$. A comparator or enable circuit (not shown in FIG. 4) may be used to detect the input signal to activate the lift amplifier 35. The input threshold voltage $LFT_{in}$ is set to have a value greater than a common mode voltage (CM) of the input signal voltage so as to minimize the power consumption of the system. It should be noted that since the gain G of the line driver 21 is a given parameter, an output threshold voltage $LFT_{out}$ with respect to the output of the line driver 21 can be expressed in terms of the input threshold voltage $LFT_{in}$, i.e, $LFT_{out}=G\times LFT_{in}$, and vice versa. Since the line driver supply (driving voltage) $V_{cclift}$ must be greater than the output signal voltage (OUT) of the line driver 21, the operation of the circuit 20 is explained with respect to the output signal voltage (OUT) and the corresponding output threshold voltage (LFT$_{out}$).

FIG. 5A schematically illustrates the waveforms of the output signal voltage (OUT) of the line driver 21 (line 41), the driving voltage (dynamically controlled supply voltage) V$_{cclift}$(line 43), and an output voltage (OL) of the lift amplifier 35 at the output node 37 (line 45). When the output signal voltage (OUT) of the line driver 21 is below the output threshold voltage (LFT$_{out}$), the driving voltage V$_{cclift}$ is supplied from the fixed supply voltage V$_{cc}$ through the lift diode 31, i. e., the driving current is supplied through the lift diode 31 to the line driver 21 (FIG. 4). As shown in FIG. 5A, the driving voltage V$_{cclift}$ is a diode drop (V$_{diode}$) below the fixed supply voltage V$_{cc}$. FIG. 5B schematically illustrates the current provided from the lift amplifier 35 and the lift diode 31 which corresponds to the driving voltage V$_{cclift}$.

The lift amplifier 35 is biased such that, when the output signal voltage (OUT) is at the output threshold voltage LFT$_{out}$, the output (OL) of lift amplifier 35 will be at a certain predetermined voltage (LAMIN). This predetermined voltage (LAMIN) is typically chosen to allow enough headroom for the lift amplifier 35 (and for a clamp circuit (CL) 39, as described below).

When the output signal voltage (OUT) of the line driver 21 goes above the output threshold voltage LFT$_{out}$(i.e., the input signal voltage goes above the input threshold voltage LFT$_{in}$), the output (OL) of the lift amplifier 35 goes above the predetermined voltage LAMIN. Since the bottom plate of the lift capacitor 33 is connected to the output node 37, the lift capacitor 33 momentarily preserves its voltage and then its top plate which follows the bottom plate is lifted above the fixed voltage V$_{cc}$ minus the diode drop V$_{diode}$, effectively shutting off the lift diode 31. Thus, in this lifting mode, the driving voltage V$_{cclift}$ is supplied from the lift amplifier 35 through the lift capacitor 33.

Since the lift amplifier 35 has the same gain and delay as the line driver 21, during the lifting mode the dynamically controlled supply voltage (driving voltage) V$_{cclift}$ (line 43) exactly follows the output of the line river 21 (line 41), resulting in a fixed predetermined headroom (V$_{head}$) for the line driver 21 throughout the lift operation, as shown in FIG. 5A. This prevents clipping in the line driver output as long as the dynamic line driver supply voltage V$_{cclift}$ can handle the highest signal peaks. Since during lifting the line driver supply voltage V$_{cclift}$ goes above the fixed supply voltage V$_{cc}$, the fixed supply voltage V$_{cc}$ can be chosen to be smaller than a conventional fixed supply voltage (i.e., the maximum peak voltage plus a headroom) without causing clipping.

It should be noted that in the dynamic supply control system, all the currents are eventually supplied by the fixed supply voltage V$_{cc}$ and no current is actually provided by the lifted supply voltage V$_{cclift}$. During lifting operation where the lift diode 31 is shut off, the lift amplifier 35 provides the current for the line driver 21 through the lift capacitor 33. That is, the lift capacitor 33 discharges some of its electric charge during the lifting operation. Therefore, the capacitance of the lift capacitor 33 is selected to be large enough so that the lost charge does not result in a significant voltage drop in the lift capacitor 33.

In accordance with one embodiment of the present invention, the dynamic supply control scheme is so designed that lifting occurs only occasionally based on the input signal pattern and statistics. However, since the lift capacitor 33 discharges some of its electric charge whenever it is driven by the lift amplifier 35, the lift capacitor 33 looses its lift capability little by little unless the lost charge is replaced.

Thus, a charger circuit may be used to prevent the lift capability from decreasing. The charger circuit is coupled to the output node 37 and charges the lift capacitor 33 so that the output node 37 is maintained at the predetermined voltage (LAMIN) when the input signal voltage is smaller than the input threshold voltage (LFTin).

The charger circuit may include a clamp circuit (CL) 39 as shown in FIG. 4. FIG. 6 schematically illustrates an example of the charger circuit 40 including a clamp circuit (CL) 39 and an enable circuit 51. The clamp circuit 39 may be as simple as a voltage-controlled current source. The enable circuit 51 enables the clamp circuit 39 whenever lifting does not occur, typically, when the input signal voltage is smaller than the input threshold voltage LFTin.

The clamp circuit 39 compares the output (OL) of lift amplifier 35 with a reference voltage which is set at the predetermined voltage LAMIN, and conducts the proper amount of current to the lift capacitor 33 so as to charge the lift capacitor 33. With this closed-loop control, the bottom plate of the lift capacitor 33 (i.e., the output node 37) is maintained at the predetermined voltage level (LAMIN) in a continuous manner when the lift amplifier 35 is not lifting. The timing of activating the clamp circuit 39 may be determined by monitoring the input signal voltage and comparing it to a reference voltage using the comparator 51. The reference voltage is typically set to the input threshold voltage LFT$_{in}$=LFT$_{out}$/G. The comparator 51 may also be used as an enable circuit for the lift amplifier 35, as mentioned above. The reference voltage of the comparator 51 may be set a small amount lower than the input threshold voltage LFT$_{in}$ considering the response time of the circuit, as is well understand by one of ordinary skilled in the art.

FIG. 7 schematically illustrates a charger circuit 50 in accordance with another embodiment of the present invention. As shown in FIG. 7, the charger circuit 50 includes a current supply 53 and a switching circuit 55 coupling the current supply 53 to the output node 37. The switching circuit 55 electrically connects the current supply 53 to the output node 37 when a voltage of the output node 37 is greater than the predetermined voltage LAMIN and the input signal voltage is smaller than the input threshold voltage LFT$_{in}$. It should be noted the circuit structure of the switching circuit 55 is one example and the switching circuit 50 may have a different structure. In addition, hysteresis in the device response may be considered to provide slightly different threshold voltages for the rising edge and falling edge of the input signal voltage (IN).

In accordance with one embodiment of the present invention, the lift amplifier 35 is a Class-AB amplifier biased as described above. When the output signal voltage (OUT) goes below the output threshold voltage LFT$_{out}$, the Class-AB lift amplifier 35 tries to drive the bottom plate of the lift capacitor 33 below the predetermined voltage LAMIN. In order to prevent this from happening, a limiter circuit (LIM) 55 is provided between the input node 27 and the lift amplifier 35 as shown in FIG. 4. The limiter circuit 55 limits the input voltage signal (IN) input to the lift amplifier 35 such that the output (OL) of the lift amplifier 35 is allowed to go freely above the predetermined voltage LAMIN, but is prevented from going below the predetermined voltage LAMIN. For example, the limiter circuit 55 clips the input signal voltage below the input threshold voltage LFT$_{in}$. Alternatively, the limiter circuit may be provided at the output of the lift amplifier 35 so as to clip the output (OUT) of the lift amplifier 35 in a similar manner.

In accordance with another embodiment of the present invention, the lift amplifier 35 is designed to be of a Class-A type amplifier with a limited current sink capability as opposed to Class-AB type having high sink. In this embodiment, the limiter circuit 55 may be omitted, since the lift capacitor 33 will act so as to limit the output of the lift amplifier 35. As the output of the lift amplifier 35 tries to go below the predetermined voltage LAMIN, the lift capacitor 33 resists to this change by preserving the voltage thereon. The lift amplifier 35 sinks as much current as possible, which is limited. The limited current sink of the lift amplifier 35 will help the clamp circuit 39 charging the lift capacitor 33 outside the lifting operation.

In accordance with one embodiment of the present invention, the lifting point triggering the lift operation (i.e., the input/output threshold voltage) is determined so as to minimize a total power consumption of the dynamic supply control system with respect to parameters given by the system standards and/or specification. In DSL/ADSL systems, the power to be delivered to the transmission line and the PAR of the output signal voltage are typically specified by the standards, and thus a DSL/ADSL line driver must support a certain signal peak. Typically a transformer is used to trade the maximum voltage swing at the line driver output with the maximum current which must be provided to the transmission line.

Therefore, in a conventional fixed supply system, the available supply voltage and the minimum headroom requirement of the line driver usually dictates the turns ratio of the transformer. However, in a dynamic supply control scheme in accordance with one embodiment of the present invention, the designer of the system has more freedom to chose the maximum achievable amplitude at the line driver output and hence the transformer turns ratio which must be used. For example, referring to the dynamic supply control system shown in FIG. 4, let us consider the following parameters:

| | |
|---|---|
| $V_{cc}$ | fixed supply voltage (board supply voltage) |
| $V_{lmax}$ | peak amplitude at the transmission line having impedance $R_L$ |
| $I_{lmax}$ | peak current at the output of the line driver |
| n | turns ratio of the transformer |
| $A_{max}$ | peak amplitude of the output of the line driver (output signal voltage) |
| CM | the common mode voltage of the output of the line driver |
| $V_{diode}$ | the diode drop of the lift diode |
| $V_{head}$ | the headroom requirement on the positive side (above CM) and negative side (below CM) of the output of the line driver |

Assuming that the lift point in the output signal (i.e., the output threshold voltage $LFT_{out}$) is given by $LFT_{out}=CM+A_{max} \times R$, where R is a constant (0<R<1) depending on the input signal pattern, the following relationships are obtained:

$$A_{max}=V_{lmax}/n \quad (1)$$

$$I_{lmax}=n \times V_{lmax}/R_L \quad (2)$$

$$CM-A_{max}=V_{head} \quad (3)$$

$$CM+A_{max} \times R=V_{cc}-V_{diode}-V_{head} \quad (4)$$

As is seen from FIG. 5A, Equation (3) expresses the headroom requirement for the line driver on the negative side (i.e., below the common mode voltage CM of the output signal voltage), and Equation (4) expresses the headroom requirement for the line driver on the positive side (i.e., above the common mode voltage CM of the output signal voltage). From Equations (3) and (4), the peak amplitude A. is obtained as:

$$A_{max}=(V_{cc}-V_{diode}-2 \times V_{head})/(1+R) \quad (5)$$

From Equation (5), it can be seen that as the value of the constant R decreases the value of the maximum amplitude $A_{max}$ increases. Since the constant R specifies the lift point in terms of the fraction of the maximum peak amplitude at the line driver output, Equation (5) means that the sooner the lift operation begins, the greater will be the maximum achievable voltage swing at the line driver output. From Equation (1), for a given maximum amplitude $V_{lmax}$ at the transmission line (as required by the standards), a larger maximum amplitude $A_{max}$ of the line driver output will result in a smaller turns ration. Then from Equation (2), a smaller turns ratio n will result in a smaller line driver current and hence a smaller power dissipation. This is because the average power dissipation is the average of ($V_{cc} \times I_{linedriver}$) where $V_{cc}$ denotes the fixed supply voltage and $I_{linedriver}$ denotes the line driver current.

However, it should be noted that as the lifting point is lowered for a given signal pattern, lifting occurs more often and thus the lift amplifier operates more often. Every time the lift amplifier 35 is activated, the lift capacitor 33 is discharged to supply the current to the line driver 21 (FIG. 4). The electric charge lost from the lift capacitor 33 during lifting is then compensated by the clamp circuit 39 (or charger circuit) outside of lifting in order to maintain the lift capability, as described above. This means that at steady state the current delivered by the lift amplifier 35 during lifting must be equal to the current supplied by the clamp circuit 39, i.e., an equal amount of power used by the lift amplifier 35 during lifting will be consumed by the charging action outside of lifting. In other words, the lifting operation is "extra expensive," since it consumes the power twice: first by the lift amplifier 35 discharging the lift capacitor 33; and then by the clamp circuit 39 charging the lift capacitor 33.

Therefore, in order to reduce the power consumption, the amount of time the lift amplifier 35 stays active should be minimized, which would be achieved by increasing the lift point (i.e., the input/output threshold voltages However, this seems to be contrary to the observation that the lift point must be as low as possible to maximize the voltage swing available from the line driver. Considering the two contradicting requirements, the applicants realized that there must be an optimum value for R providing the optimum lifting point for a given input signal voltage pattern.

The applicants conducted extensive system simulations using actual DMT signal patterns, and found that an optimum R indeed exists to minimize the power dissipation. The optimum value of R is around 0.3 for DMT signals. That is, the lift point should be chosen such that when the output signal voltage (OUT) reaches about 30% of its maximum peak past the common mode (CM), the lifting action should take place. FIG. 8 schematically illustrates an example of the simulation result for a fixed supply voltage: $V_{cc}$=10V, power at the transmission line: $P_{line}$=100 mW, headroom: $V_{head}$=1.0V, diode drop: $V_{diode}$=0.8V, and the peak amplitude at the transmission line: $V_{lmax}$=36V. As shown in FIG. 8, the power consumption curve shows a shallow minimum at around 30% (i.e., the value of R is around 0.3). It should be noted that the ratio R is signal-dependent, and when the pattern and statistics of the input signal changes, the optimum value of R will also changes to minimize the system power consumption. The statistics of DMT signals used in ADSL system is fairly constant and system level simulations indicate that the optimality of the lift point indicated above is preserved almost all the time.

The dynamic supply control system according to the above-discussed embodiments is described as having a single fixed supply voltage $V_{cc}$. However, the dynamic supply control in accordance with the present invention is also applicable to a bipolar (dual) supply system, i.e., a supply system with one positive supply voltage and one negative supply voltage of equal magnitudes ($V_{dd}$ and Vss, where $V_{ss}=-V_{dd}$).

FIG. 9 schematically illustrates a line driver circuit having a dynamic supply control circuit 60 with a dual-supply system in accordance with one embodiment of the present invention. The line driver circuit includes a line driver (LD) 61 and the dynamic supply control circuit 60 for the line driver 61. The line driver 61 has an amplification factor (gain) G and drives a transmission line 63 having a load $R_L$ via a transformer 65 having a turns ratio of 1:n. The common-mode voltage (CM) of the line driver output (OUT) is 0V, i.e. the output signal voltage of the line driver 61 swings around the center-voltage of 0V. The line driver 61 is supplied with two dynamically-controlled supply voltages: a positive supply voltage (first driving voltage) $V_{ddlift}$ and a negative supply voltage (second driving voltage) $V_{sslift}$.

As shown in FIG. 9, the dynamic supply control circuit 60 includes an input node 67 for receiving an input signal voltage (IN), and a first (positive) portion 60a and a second (negative) portion 60b coupled between the input node 67 and the line driver 61. The line driver 61 is also coupled to the input node 67 and receives the input signal voltage (IN).

The first portion 60a includes a first supply node 71 for supplying the first driving voltage $V_{ddlift}$ to the line driver 61, a first lift diode (DLIFTP) 73, a first lift capacitor (CLIFTP) 75, and a first (positive) lift amplifier (LAP) 77. The first lift diode 73 is coupled between a first fixed supply voltage $V_{dd}$ and the first supply node 71, and the first lift capacitor 75 is coupled between the first supply node 71 and a first output node 79. The first lift amplifier 77 is coupled between the input node 67 and the output node 79 (through an optional limiter circuit 95), and supplied with a first (positive) lift amplifier supply voltage $V_{dda}$ and a second (negative) lift amplifier supply voltage $V_{ssa}$.

Similarly, the second portion 60b includes a second supply node 81 for supplying the second driving voltage $V_{sslift}$ to the line driver 61, a second lift diode (DLIFTM) 83, a second lift capacitor (CLIFTM) 85, and a second lift amplifier (LAN) 87. The second lift diode 83 is coupled between a second fixed supply voltage $V_{ss}$ and the second supply node 81, and the second lift capacitor 85 is coupled between the second supply node 81 and a second output node 89. The second lift amplifier 87 is coupled between the input node 67 and the second output node 89 (through an optional limiter circuit 97), and supplied with the first (positive) lift amplifier supply voltage $V_{dda}$ and the second (negative) lift amplifier supply voltage $V_{ssa}$.

The first lift amplifier supply voltage $V_{dda}$ and the second lift amplifier supply voltage $V_{ssa}(=-V_{dda})$ are typically set equal to the first fixed supply voltage $V_{dd}$ and the second fixed supply voltage $V_{ss}(=-V_{dd})$, respectively. However, since the output of the first and second lift amplifiers only need to provide the driving voltages for a portion of the line driver output, namely, (Amax×(1−R)), the first lift amplifier supply voltage $V_{dda}$ can be chosen to be lower than the first fixed supply voltage $V_{dd}$, and the second lift amplifier supply voltage $V_{ssa}$ may be higher than the second fixed supply voltage $V_{ss}$. This saves some power of the system though extra power supplies are required.

The first lift amplifier 77 is shown in FIG. 9 as a non-inverting gain stage with an amplification factor (gain) of G which is the same as that of the line driver 61. The first lift amplifier 77 also has the same delay as the line driver 61. The first lift amplifier 77 drives the first lift capacitor 75 when the input signal voltage is greater than a first input threshold voltage $LFTP_{in}$. The first lift amplifier 77 is biased such that when the output signal voltage (OUT) of the line driver 61 is at a certain positive threshold $LFTP_{out}$ (=G× $LFTP_{in}$), the first lift amplifier output (OLP) is at a certain minimum voltage (LAMINP).

Similarly, the second lift amplifier 87 is shown in FIG. 9 as a non-inverting gain stage with an amplification factor (gain) of G which is the same as that of the line driver 61. The second lift amplifier 87 also has the same delay as the line driver 61. The second lift amplifier 87 drives the second lift capacitor 85 when the input signal voltage is smaller than a second (negative) input threshold voltage $LFTM_{in}$. The second lift amplifier 87 is biased such that when the output signal voltage (OUT) of the line driver 61 is at a certain negative threshold $LFTM_{out}(=G \times LFTM_{in})$, the second lift amplifier output (OLM) is at a certain maximum voltage (LAMINM).

FIG. 10 schematically illustrates the waveforms of the output signal voltage (OUT) of the line driver 61 (line 101), the positive driving voltage $V_{ddlift}$ (line 103), the first lift amplifier output (OLP) at the first output node 79 (line 105), the negative driving voltage $V_{sslift}$ (line 107), and the second lift amplifier output (OLM) at the second output node 89 (line 109).

As shown in FIG. 10, when the output signal voltage (OUT) is below the positive output threshold voltage ($LFTP_{out}$), the positive driving voltage $V_{ddlift}$ is supplied from the first fixed supply voltage $V_{dd}$ through the first lift diode 73, i. e., the positive driving current is supplied through the first lift diode. 73 to the line driver 61 (FIG. 9). The positive driving voltage $V_{ddlift}$ is a diode drop ($V_{diode}$) below the first fixed supply voltage $V_{dd}$. Similarly, when the output signal voltage (OUT) is above the negative output threshold voltage ($LFTM_{out}$), the negative driving voltage $V_{sslift}$ is supplied from the second fixed supply voltage $V_{ss}$ through the second lift diode 83, i. e., the negative driving current is supplied through the second lift diode 83 to the line driver 61 (FIG. 9). The negative driving voltage $V_{sslift}$ is a diode drop ($V_{diode}$) above the second fixed supply voltage $V_{ss}$.

When the output signal voltage (OUT) goes above the positive output threshold voltage $LFTP_{out}$(i.e., the input signal voltage goes above the positive input threshold voltage $LFTP_{in}$), the positive output (OLP) of the first lift amplifier 77 goes above the predetermined voltage LAMINP. Since the bottom plate of the first lift capacitor 75 is connected to the first output node 79, the first lift capacitor 75 momentarily preserves its voltage and then its top plate which fellows the bottom plate is lifted above the first fixed voltage $V_{dd}$ minus the diode drop $V_{diode}$, effectively shutting off the first lift diode 73. Thus, in this positive lifting mode, the positive driving voltage $V_{ddlift}$ is supplied from the first lift amplifier 77 though the first lift capacitor 75.

Since the first lift amplifier 77 has the same gain and delay as the line driver 61, during the positive lifting mode the positive driving voltage $V_{ddlift}$(line 103) exactly follows the output of the line river 61 (line 101), providing a fixed predetermined headroom ($V_{head}$) for the positive output of the line driver 61 during the positive lifting operation, as shown in FIG. 10.

When the output signal voltage (OUT) goes below the negative output threshold voltage $LFTM_{out}$(i.e., the input signal voltage goes below the negative input threshold voltage $LFTM_{in}$), the negative output (OLM) of the second lift amplifier 87 goes below the predetermined voltage LAMINM. Since the top plate of the second lift capacitor 85 is connected to the second output node 89, the second lift capacitor 85 momentarily preserves its voltage and then its bottom plate which follows the top plate is lifted below the second fixed voltage $V_{ss}$ plus the diode drop $V_{diode}$, effectively shutting off the second lift diode 83. Thus, in this negative lifting mode, the negative driving voltage $V_{sslift}$ is supplied from the second lift amplifier 87 though the second lift capacitor 85.

Since the second lift amplifier 87 has the same gain and delay as the line driver 61, during the negative lifting (pulling down) mode the negative driving voltage $V_{sslift}$ (line 107) exactly follows the output of the line river 61 (line 101), resulting in a fixed predetermined headroom ($V_{head}$) for the negative output of the line driver 61.

For the same reasons as described above with respect to the single supply system, charger circuits may be used to prevent the first and second lift capacitors 75 and 85 from gradually loosing their lift capability, in accordance with one embodiment of the present invention. As shown in FIG. 9, a first charger circuit (for example, a clamp circuit) 91 is coupled to the first output node 79 and charges the first lift capacitor 75 so that the first output node 79 is maintained at the predetermined positive voltage (LAMINP) when the input signal voltage is smaller than the positive input threshold voltage (LFTP$_{in}$). Similarly, a second charger circuit (for example, a clamp circuit) 93 is coupled to the second output node 89 and charges the second lift capacitor 85 so that the second output node 89 is maintained at the predetermined negative voltage (LAMINM) when the input signal voltage is larger than the negative input threshold voltage (LFTM$_{in}$). An enable circuit (not shown in FIG. 9) may be used for each of the clamp circuits so as to monitor the input signal voltage and activates the corresponding clamp circuit in the same manner as described above in the previous embodiments.

Instead of using a clamp circuit which charges the lift capacitor in a continuous manner, each of the charger circuits may employ a switched-current supply circuit having a fixed current supply and a switching circuit such as shown in FIG. 7. It should be noted that the switched-current supply circuit for the second portion 60b should have the opposite polarity to that for the first portion 60a of the dynamic supply control circuit.

In accordance with one embodiment of the present invention, the first and second lift amplifiers 77 and 87 are of Class-AB type, and thus limiter circuits are provided in a similar manner as the previous embodiments. As shown in FIG. 9, the dynamic supply control circuit 60 may further include a first limiter circuit (LIMP) 95 coupled between the input node 67 and the first lift amplifier 77, and a second limiter circuit (LIMM) 97 coupled between the input node 67 and the second lift amplifier 87. The first limiter circuit 95 clips the input signal voltage lower than the positive input threshold voltage LFTP$_{in}$, and the second limiter circuit clips the input signal voltage higher than the negative input threshold voltage LFTM$_{in}$. Alternatively, the limiter circuits may be provided at the output of the lift amplifiers 77 and 87.

In accordance with another embodiment of the present invention, the first and second lift amplifiers are designed to be of Class-A type having limited current sink and limited source capabilities, respectively. In this case, the limiter circuits 95 and 97 can be omitted.

In the same manner as the previous embodiments, the optimum lifting point, e.g., the positive and negative input threshold voltages LFTP$_{in}$ and LFTM$_{in}$ can be determined so as to minimize a total power consumption of the system. Through extensive system level simulations, it can be shown that the same optimum R as the one found for a single supply system, holds for a dual supply system as well.

Using the parameters defined above, the design constraints for the dual supply system are expressed as:

$$A_{max} \times R = V_{dd} - V_{diode} - V_{head} \quad (6)$$

$$A_{max} - A_{max} \times R \leq 2 \times V_{dda} - V_{head1} \quad (7)$$

where $V_{head1}$ denotes the total headroom requirement for the lift amplifiers (i.e., the sum of the negative side and positive side headrooms). If it is assumed that $V_{dda} = V_{dd}$, Equation (7) is expressed as:

$$A_{max} - A_{max} \times R \leq 2 \times V_{dd} - V_{head1} \quad (7)'$$

Equation (6) is the headroom requirement for the line driver on the positive and negative sides, and Equation (7) or (7)' places a limit to the peak amplitude $A_{max}$ at the line driver output due to the finite lift amplifier supply voltage $V_{dda}$.

The main advantage of a dual supply system (such as shown in FIG. 9) over a single supply system (such as shown in FIG, 4) is the fact that both of the positive and negative supply voltages for the line driver can be lifted in the dual supply system. While in a single supply system the "negative" supply voltage is by definition fixed to 0V and thus cannot be lifted, in a dual supply system the positive supply voltage can be lifted up above a fixed positive board supply $V_{dd}$, while the negative supply voltage can also be lifted down below a fixed negative board supply $V_{ss}$. Thus, for the same amount of available fixed supply voltage range, the dynamically controlled supply voltage in a dual supply system can be increased more than that in a single supply system.

For example, consider a single supply system with the fixed supply voltage $V_{cc} = 6.0V$ and a dual supply system with the fixed supply and lift amplifier supply voltages $V_{dd} = V_{dda} = 3.0$ and $V_{ss} = V_{ssa} = -3.0V$. That is, both supply systems have the same available fixed supply voltage range of 6.0V. It is also assumed that the diode drop $V_{diode} = 0.8V$, headroom $V_{head} = 0.5V$, and the signal dependent constant R=0.3 for the both systems. For the single supply system, the peak amplitude at the line driver output $A_{max} = 3.2V$ from Equation (5), while for the dual supply system, $A_{max} = 5.7V$ from Equation (6). Since the maximum available amplitude with the dynamic supply control is greater in a dual supply system than in a single supply system, in order to provide the same maximum voltage on the transmission line $V_{lmax}$, a smaller transformer turns ratio can be used in the dual supply system, leading to smaller current and consequently smaller power consumption.

In accordance with a preferred embodiment of the present invention, the lift amplifier(s) and the line driver are formed on the same Integrated Circuit (IC), so as to provide precise gain and delay matching between the line driver and the lift amplifier(s). FIG. 11 schematically illustrates a conventional IC chip 110 where an output device (n-type transistor 111) of the line driver is formed on a substrate 113. In standard IC chips, the substrate on which all the semiconductor devices or transistors are placed must be biased with the most negative voltage in the IC chip in order to prevent the transistors from latching up and from drawing currents which may be destructive to the IC devices. In a conventional fixed supply system, the substrate 113 is biased with the most negative voltage $V_{ss}$, as shown in FIG. 11.

However, when the dynamic supply control is employed, the output signal voltage (OUT) of the line driver can go below the most negative power supply voltage $V_{ss}$ during the lift operation. Since a parasitic diode 115 exists between an output node of the transistor 111 and the substrate 113, such a "super-negative" voltage would turn on the parasitic diode 115 to cause an undesirable current in the conventional substrate 113. Such a current may cause an output to the IC clip and also lead to latch-up of the transistor 111 depending on the circuit layout. In order to prevent such undesirable effects, a third negative supply can be used so as to bias the substrate 113 with the third negative supply, which may be chosen to be more negative than the most negative signal voltage expected at the line driver output. However, providing an additional voltage supply (with a greater negative voltage capability) is not desirable from a cost and complexity standpoint.

Therefore, in accordance with one embodiment of the present invention, a special process providing a deep N-well structure is employed. FIG. 12A schematically illustrates a semiconductor structure 120 in accordance with this process. As shown in FIG. 12A, an n-type well (deep N-well) 121 is provided in the semiconductor substrate 122, and a p-type well 125 is placed within the n-type well 121. The substrate 122 is biased with the fixed supply voltage (negative board supply voltage) $V_{ss}$. The n-type well 121 is biased at a certain positive voltage, for example, the first fixed supply voltage $V_{dd}$. The p-type well 125 is biased at the negative driving voltage, i.e., the dynamically controlled negative line driver supply voltage $V_{sslift}$. A transistor (NMOS-FET) 127 having a gate (G), a drain (D), and a source (S) is formed on the p-type well 125. Since the n-type well is biased at a certain positive voltage (in this case at $V_{dd}$), it isolates the p-type well 125 and the NMOS transistor 127 formed therein from the substrate 122. FIG. 12B shows an equivalent circuit diagram of the deep N-well structure 120.

FIG. 13 schematically illustrates an output stage of the line driver 61 shown in FIG. 9. As is well understood by one of ordinary skilled in the art, a line driver typically includes a preamplifier (not shown in FIG. 13), a pair of error amplifiers 131 and 133, and a pair of output transistors 135 and 137. As shown in FIG. 13, the output (NMOS) transistor 137 has the semiconductor structure 120 as described above. FIG. 14 illustrates the negative side of the output stage in more detail. As shown in FIG. 14, driver transistors 141 and 143, which are the associated with the output transistor 137, have the same deep N-well structure as the output transistor 137 to match their operation.

The output transistor 137, whose drain actually goes below the fixed negative voltage $V_{ss}$, and the transistors 141 and 143 which are supposed to match the output transistor 137, are placed in a p-well which in turn is placed inside the deep N-well, as described above. The p-well which constitutes the body of the respective NMOS transistor is biased with the dynamically controlled supply voltage (negative driving voltage) $V_{sslift}$. Since the negative driving voltage $V_{sslift}$ is always below the output signal voltage (OUT) of the line driver, the parasitic diode between the output node and the p-well is prevented from turning on. Thus, the resulting undesirable effect such as latch-up is also prevented. Furthermore, by providing the deep N-well structure, the output device can be locally biased at the "super" negative voltage without affecting or changing the substrate's fixed bias voltage.

The previous embodiments and associated figures are based on the single-ended structure. However, the dynamic supply control of the present invention is equally applicable to differential systems. In accordance with one embodiment of the present invention, the line driver circuit is configured as a differential driver circuit as opposed to a single-ended one. FIG. 15 schematically illustrates one example of a differential implementation of a line driver circuit 150 with dynamic supply control.

As shown in FIG. 15, the line driver circuit 150 includes a first line driver (positive portion: LDP) 151a, a second line driver (negative portion: LDM) 151b, a first supply controller 153 and a second supply controller 155 for the first line driver 151a, and a third supply controller 157 and a fourth supply controller 159 for the second line driver 151b. The first and second line drivers 151a and 151b form a differential line driver 151 which is coupled between an input port 161 (first and second input nodes 161a and 161b) and an output port 163 (first and second driver output nodes 163a and 163b). A differential input signal voltage (first input signal voltage INP and second input signal voltage INM) is received at the input port 161 and a differential-output signal voltage (first output signal voltage OUTP and second input signal voltage OUTM) from the line driver 151 is supplied to the output port 163. A first fixed supply voltage $V_{dd}$ is provided by a positive voltage supply, and a second fixed supply voltage $V_{ss}(=-V_{dd})$ is provided by a negative voltage supply.

The first and second line drivers 151a and 151b have an amplification factor (gain) G. The first line driver 151a is supplied with a first positive driving voltage $V_{ddlift1}$ and a first negative driving voltage $V_{sslift1}$, and outputs the first output signal voltage (OUTP) to the first driver output node 163a. Similarly, the second line driver 151b is supplied with a second positive driving voltage $V_{ddlift2}$ and a second negative driving voltage $V_{sslift2}$, and outputs the second output signal voltage (OUTM) to the second driver output node 163b.

The first supply controller 153 is coupled to the first input node 161a and to the first line driver 151a. The first supply controller 153 includes a first supply node 161 for supplying the first positive driving voltage $V_{ddlift1}$ to the first line driver 151a, a first lift diode 163, a first lift capacitor 165, and a first lift amplifier 167. The first lift diode 163 is coupled between the first fixed supply voltage $V_{dd}$ and the first supply node 161, and the first lift capacitor 165 is coupled between the first supply node 161 and a first output node 169. The first lift amplifier 167 has the amplification factor G, and is coupled between the first input node 161a and the first output node 169 (through an optional limiter circuit 211). The first lift amplifier 167 drives the first lift capacitor 165 when the first input signal voltage (INP) is greater than a first input threshold voltage $LFTP_{in}$.

The first dynamic supply controller 153 maintains the first positive driving voltage $V_{ddlift1}$ a first predetermined amount (i.e., the diode drop of the first lift diode 163) below the first fixed supply voltage $V_{dd}$ when the first output signal voltage (OUTP) is below a first output threshold voltage $LFTP_{out}$ (=G×$LFTP_{in}$). When the first output signal voltage (OUTP) rises above the first output threshold voltage $LFTP_{out}$, the first dynamic supply controller 153 lifts the first positive driving voltage $V_{ddlift1}$ a second predetermined amount (headroom) above the first output signal voltage (OUTP). By this lifting operation, the peak of the first positive driving voltage $V_{ddlift1}$ becomes greater than the first fixed supply voltage $V_{dd}$, preventing clipping of the first line driver output. The first supply controller 153 operates substantially in the same manner as the first (positive) portion 60a of the dynamic supply control circuit 60 (FIG. 9) described above.

Similarly, the second supply controller 155 is coupled to the first input node 161a and to the first line driver 151a. The second supply controller 155 includes a second supply node 171 for supplying the first negative driving voltage $V_{sslift1}$ to the first line driver 151a, a second lift diode 173, a second lift capacitor 175, and a second lift amplifier 177. The second lift diode 173 is coupled between the second fixed supply voltage $V_{ss}$ and the second supply node 171, and the second lift capacitor 175 is coupled between the second supply node 171 and a second output node 179. The second lift amplifier 177 has the amplification factor G, and is coupled between the first input node 161a and the second output node 179 (through an optional limiter circuit 213). The second lift amplifier 177 drives the second lift capacitor 175 when the first input signal voltage (INP) is smaller than a second input threshold voltage $LFTM_{in}$.

The second dynamic supply controller 155 maintains the first negative driving voltage $V_{sslift1}$ the first predetermined amount (i.e., the diode drop of the second lift diode 173) above the second fixed supply voltage $V_{ss}$ when the first output signal voltage is above a second output threshold voltage $LFTM_{out}(=G \times LFTM_{in})$. When the first output signal voltage goes below the second output threshold voltage $LFTM_{out}$, the second supply controller 155 pulls down (i.e., lifts in the negative direction) the first negative driving voltage $V_{sslift1}$ the second predetermined amount (headroom) below the first output signal voltage $V_{ss}$. By this pulling (negative lifting) operation, the peak of the first negative driving voltage $V_{sslift1}$ becomes lower than the second fixed supply voltage $V_{ss}$. The second supply controller 155 operates substantially in the same manner as the second (negative) portion 60b of the dynamic supply control circuit 60 (FIG. 9) described above.

The third supply controller 157 is coupled to the second input node 161b and to the second line driver 151b. The third supply controller 157 includes a third supply node 181 for supplying the second positive driving voltage $V_{ddlift2}$ to the second line driver 151b, a third lift diode 183, a third lift capacitor 185, and a third lift amplifier 187. The third lift diode 183 is coupled between the first fixed supply voltage $V_{dd}$ and the third supply node 181, and the third lift capacitor 185 is coupled between the third supply node 181 and a third output node 189. The third lift amplifier 187 has the amplification factor G, and is coupled between the second input node 161b and the third output node 191 (through an optional limiter circuit 215). The third lift amplifier 187 drives the third lift capacitor 185 when the second input signal voltage (INM) is greater than the first input threshold voltage $LFTP_{in}$.

The third dynamic supply controller 157 maintains the second positive driving voltage $V_{ddlift2}$ the first predetermined amount (diode drop of the third lift diode 183) below the first fixed supply voltage $V_{dd}$ when the second output signal voltage (OUTM) is below the first output threshold voltage $LFTP_{out}$. When the second output signal voltage rises above the first output threshold voltage $LFTP_{out}$ the third dynamic supply controller 157 lifts the second positive driving voltage $V_{ddlift2}$ the second predetermined amount (headroom) above the second output signal voltage (OUTM). By this lifting operation, the peak of the second positive driving voltage $V_{ddlift2}$ becomes greater than the first fixed supply voltage $V_{dd}$. The third supply controller 157 operates substantially in the same manner as the first (positive) portion 60a of the dynamic supply control circuit 60 (FIG. 9) described above.

The fourth supply controller 159 is coupled to the second input node 161b and to the second line driver 151b. The fourth supply controller 159 includes a fourth supply node 191 for supplying the second negative driving voltage $V_{sslift2}$ to the second line driver 151b, a fourth lift diode 193, a fourth lift capacitor 195, and a fourth lift amplifier 197. The fourth lift diode 193 is coupled between the second fixed supply voltage $V_{ss}$ and the fourth supply node 191, and the fourth lift capacitor 195 is coupled between the fourth supply node 191 and a fourth output node 199. The fourth lift amplifier 197 has the amplification factor G, and is coupled between the second input node 161b and the fourth output node 199 (through an optional limiter circuit 217). The fourth lift amplifier 187 drives the fourth lift capacitor 195 when the second input signal voltage (INM) is smaller than the second input threshold voltage $LFTM_{in}$.

The fourth supply controller 159 maintains the second negative driving voltage $V_{sslift2}$ the first predetermined amount (diode drop of the fourth lift diode 193) above the second fixed supply voltage $V_{ss}$ when the second output signal voltage is above the second output threshold voltage $LFTM_{out}$. When the second output signal voltage (OUTM) goes below the second output threshold voltage $LFTM_{out}$ the fourth supply controller 159 pulls down (lifts in the negative direction) the second negative driving voltage $V_{sslift2}$ the second predetermined amount (headroom) below the second output signal voltage (OUT). By this negative lifting operation, the peak of the second negative driving voltage $V_{sslift2}$ becomes lower than the second fixed supply voltage $V_{ss}$. The fourth supply controller 159 operates substantially in the same manner as the second (negative) portion 60b of the dynamic supply control circuit 60 (FIG. 9) described above.

For the same reasons described above, each of the first, second, third, and fourth supply controllers 153, 155, 157, and 159 may include a respective charger circuit 201, 203, 205, or 207 in accordance with one embodiment of the present invention. The first and third charger circuit 201 and 205 charge the first and third lift capacitors 165 and 185, respectively, so that the first and third output nodes 169 and 189 are maintained at a first predetermined voltage LAMINP, respectively, when the respective input signal voltage is lower than the first input threshold voltage $LFTP_{in}$. Similarly, the second and fourth charger circuits 203 and 207 charge the second and fourth lift capacitors 175 and 195, respectively, so that the second and fourth output nodes 179 and 199 are maintained at a second predetermined voltage LAMIM, respectively, when the respective input signal voltage is higher than the second input threshold voltage $LFTM_{in}$. The charger circuits 201, 203, 205, and 207 may be implemented using clamp circuits or switched current supplies as described above.

In accordance with one embodiment of the present invention, each of the first, second, third, and fourth supply controllers 153, 155, 157, and 159 may include a respective limiter circuit 211, 213, 215, or 217 when the lift amplifiers 167, 177, 187, and 197 are of Class AB type, as shown in FIG. 15. When each of the lift amplifiers 167, 177, 187, and 197 is of Class A type with a limited sink or source capability, these limiter circuits may be omitted as explained in the previous embodiments.

FIG. 16 schematically illustrates a line driver circuit 220 in accordance with one embodiment of the present invention. The line driver circuit 220 is a differential amplifier with a dual supply system, and its circuit structure is simplified compared with the line driver circuit 150 shown in FIG. 15. With this simplified structure, the number of lift amplifiers as well as the number of off-chip components is reduced.

As shown in FIG. 16, the line driver circuit 220 includes an input node 221 (first and second input nodes 221a and 221b), an output node 223 (first and second driver output nodes 223a and 223b), a first line driver (positive portion: LDP) 225a coupled between the first input node 221a and the first driver output node 223a, and a second line driver (negative portion: LDM) 225b coupled between the second input node 221b and the second driver output node 223b. The line driver circuit 220 further includes a first supply controller 227 providing a positive driving voltage $V_{ddlift}$ to the first and second line drivers 225a and 225b, a second supply controller 229 providing a negative driving voltage $V_{sslift}$ to the first and second line drivers 225a and 225b, first and second limiter circuits 231 and 233 coupled to the first input node 221a, third and fourth limiter circuits 235 and 237 coupled to the second input node 221b, a first adder 239, and a second adder 241. A first fixed supply voltage $V_{dd}$ is provided by a positive voltage supply, and a second fixed supply voltage $V_{ss}(=-V_{dd})$ is provided by a negative voltage supply.

The first and second line drivers 225a and 225b form a differential line driver 225 coupled between the input port 221 and the output port 223. A differential input signal voltage (first input signal voltage INP and second input signal voltage INM) is received at the input port 221. The first line driver 225a, which has an amplification factor G, receives the. first input signal voltage (INP) and outputs a first output signal voltage (OUTP) to the first driver output node 223a. Similarly, the second line driver 225b, which has an amplification factor G, receives the second input signal voltage (INM) and outputs a second output signal voltage (OUTM) to the second driver output node 223b. Thus, a differential output signal voltage (the first output voltage OUTP and second output signal voltage OUTM) of the line driver 225 is supplied through the output port 223.

The first limiter circuit 231 clips the first input signal voltage below a first input threshold voltage $LFTP_{in}$, and the second limiter circuit 233 clips the first input signal voltage above a second input threshold voltage $LFTM_{in}$. Similarly, the third limiter circuit 235 clips the second input signal voltage below the first input threshold voltage $LFTP_{in}$, and the fourth limiter circuit 237 clips the second input signal voltage above the second input threshold voltage $LFTM_{in}$.

The outputs of the first and third limiter circuits 231 and 235 are input to the first adder 239. The first adder 239 adds these outputs, i.e., combines the positive portions of the first and second input signal voltages above the first input threshold voltage $LFTP_{in}$ so as to output a positive-sum input signal voltage 243. Similarly, the outputs of the second and fourth limiter circuits 233 and 237 are input to the second adder 241. The second adder 241 adds these outputs, i.e., combines the negative portions of the first and second input signal voltages below the second input threshold voltage $LFTM_{in}$ so as to output a negative-sum input signal voltage 245.

The first supply controller 227 is coupled to the first adder 239 and receives the positive-sum input signal voltage 243. The first supply controller 227 includes a first supply node 251 for supplying the positive driving voltage $V_{ddlift}$ to the first and second line drivers 225a and 225b, a first lift diode 253, a first lift capacitor 255, and a first lift amplifier 257. The first lift diode 253 is coupled between the first fixed supply voltage $V_{dd}$ and the first supply node 251, and the first lift capacitor 255 is coupled between the first supply node 251 and a first output node 259. The first lift amplifier 257 has the amplification factor G, and is coupled to the first adder 239 and the first output node 259. The first lift amplifier 257 drives the bottom plate of the first lift capacitor 255 above a predetermined voltage level LAMINP, when the positive-sum input signal voltage 243 is greater than two times the first input threshold voltage $LFTP_{in}$(i.e., $2 \times LFTP_{in}$). In other words, the first output node 259 is driven above a predetermined voltage level LAMINP, whenever, either the first input voltage INP, or the second input voltage INM goes above the first input threshold voltage $LFTP_{in}$.

The first supply controller 227 maintains the positive driving voltage $V_{ddlift}$ a first predetermined amount (diode drop of the first lift diode 253) below the first fixed supply voltage $V_{dd}$ when the positive-sum input signal voltage 243 is substantially equal to two times the first input threshold voltage $LFTP_{in}$, (i.e., $2 \times LFTP_{in}$). When the positive-sum input signal voltage 243 rises above two times the first input threshold voltage $LFTP_{in}$, the first supply controller 227 lifts the positive driving voltage $V_{ddlift}$ a second predetermined amount (headroom) above either one of the first output signal voltage (OUTP) and the second output signal voltage (OUTM). By this lifting operation, the peak of the positive driving voltage $V_{ddlift}$ becomes greater than the first fixed supply voltage $V_{dd}$.

The second supply controller 229 is coupled to the second adder 241 and receives the negative-sum input signal voltage 245. The second supply controller 229 includes a second supply node 261 for supplying the negative driving voltage $V_{sslift}$ to the first and second line drivers 225a and 225b, a second lift diode 263, a second lift capacitor 265, and a second lift amplifier 267. The second lift diode 263 is coupled between the second fixed supply voltage $V_{ss}$ and the second supply node 261, and the second lift capacitor 265 is coupled between the second supply node 261 and a second output node 269. The second lift amplifier 267 is coupled between the second adder 241 and the second output node 269. The second lift amplifier 267 drives the top plate of the second lift capacitor 265 below a predetermined voltage level LAMINM, when the negative-sum input signal voltage 245 is smaller than two times the second input threshold voltage $LFTM_{in}$. In other words, the second output node 269 is driven below a predetermined voltage level LAMINM, whenever, either the first input voltage INP, or the second input voltage INM goes below the second input voltage $LFTM_{in}$.

The second supply controller 229 maintains the negative driving voltage $V_{sslift}$ the first predetermined amount (diode drop of the second lift diode 261) above the second fixed supply voltage $V_{ss}$ when the negative-sum input signal voltage 245 is substantially equal to two times the second input threshold voltage $LFTM_{in}$. When the negative-sum input signal voltage 245 goes below two times the second input threshold voltage $LFTM_{in}$, the second supply controller pulls down (lift in the negative direction) the negative driving voltage $V_{sslift}$ the second predetermined amount (headroom) below either one of the first output signal voltage (OUTP) and the second output signal voltage (OUTM). By this pulling operation, the peak of the negative driving voltage $V_{sslift}$ becomes lower than the second fixed supply voltage $V_{ss}$.

FIG. 17A. schematically illustrates the waveforms of the positive and negative driving voltages $V_{ddlift}$ and $V_{sslift}$ with respect to the first and second output signal voltages (OUTP and OUTM), as described above. FIG. 17B schematically illustrates the waveforms of the output (OLP) of the first lift amplifier 257 and the output (OLM) of the second lift amplifier 267 with respect to the first and second input signal voltages (INP and INM), as described above. It should be noted that the output (OLP) of the first lift amplifier 257 follows the positive-sum input signal voltage 243 (with the proper level shifting and scaling), and the output (OLM) of the second lift amplifier 267 follows the negative-sum input signal voltage 245 (with the proper level shifting and scaling).

Similarly to the previous embodiments, each of the first and second supply controllers 227 and 229 may include a respective charger circuit 271 or 273 in accordance with one embodiment of the present invention. As shown in FIG. 16, the first charger circuit 271 is coupled to the first output node 259, and charges the first lift capacitor 255 so that the first output node 259 is maintained at a first predetermined voltage (LAMINP) when the positive-sum input signal voltage 243 is lower than two times the first input threshold voltage LFTP$_{in}$. Similarly, the second charger circuit 273 is coupled to the second output node 269, and charges the second lift capacitor 265 so that the second output node 269 is maintained at a second predetermined voltage (LAMINM) when the negative-sum input signal voltage 245 is higher than two times the second input threshold voltage LFTM$_{in}$. The charger circuits 271 and 273 may be implemented using clamp circuits or switched current supplies as described above.

Since the two output signal voltages (OUTP and OUTM) of the first and second line drivers 225a and 225b do not go up (or go down) at the same time (as shown in FIG. 17A), the two line drivers 225a and 225b can share one supply controller for their positive side operation (positive driving voltage V$_{ddlift}$) and another for their negative side operation (negative driving voltage V$_{sslift}$). In this embodiment, the limiter circuits 231–237 are used in order to capture positive peaks of the both first and second input signal voltages (INP and INM) for the first supply controller 227, and to capture negative peaks of the both first and second input signal voltages (INP and INM) for the second supply controller 229.

The lift amplifiers used in the embodiments described above can be configured as inverting type or non-inverting type. FIG. 18A schematically illustrates a lift amplifier 280 having an amplification factor (gain) G with a dual supply system. The above-described level-shift operation of the lift amplifier 280 can be implemented either by an extra current (I$_{lshift}$) supplied to the inverting node of the lift amplifier, by the lift amplifier input bias voltage (V$_{lshift}$), or both. FIGS. 18B and 18C illustrate an example of a non-inverting type implementation 281 and an inverting type implementation 283, respectively.

FIG. 19A schematically illustrates a lift amplifier 285 and an adder 287, which may be used as the first lift amplifier 257 and the adder 239 or the second lift amplifier 267 and the adder 241 in the line driver circuit 220. The two inputs A and B of the adder 287 may be the outputs from the first and third limiter circuits 231 and 235, for example. A combination of the lift amplifier 285 and the adder 287 can also be implemented in a non-inverting type structure 289 (FIG. 19B) or in an inverting type structure 281 (FIG. 19C).

In addition, the lift amplifiers may be powered down when they are not lifting. This will further reduce the power consumption of the line driver circuit.

FIG. 20 schematically illustrates a method for dynamically controlling a supply voltage for a line driver in accordance with one embodiment of the present invention. The line driver has an amplification factor (gain) G, and receives an input signal voltage IN and provides an output signal voltage OUT to a transmission line having a load R$_L$ via a transformer having a turns ratio of 1:n. The method may be performed using the dynamic supply control circuit 20 shown in FIG. 4.

First, the input signal voltage IN is received (301), and the input signal voltage IN is compared with an input threshold voltage LFT$_{in}$(303). The input threshold voltage LFT$_{in}$ is set higher than a common mode voltage (CM) of the input signal voltage IN. When the input signal voltage IN is smaller than the input threshold voltage LFT$_{in}$, a driving voltage V$_{cclift}$ having a value a first predetermined amount (V$_{diode}$) below a fixed supply voltage V$_{cc}$(305) is supplied to the line driver (307). The corresponding driving current is supplied from the fixed supply voltage via a diode.

When the input signal voltage IN is greater than the input threshold voltage LFT$_{in}$) the driving voltage is lifted so that the lifted driving voltage V$_{cclift}$ has a value a second predetermined amount (V$_{head}$) above the output signal voltage OUT (309). By this lifting operation, the peak of the lifted driving voltage V$_{cclift}$ is greater than the fixed supply voltage V$_{cc}$. The lift operation may include generating a lift voltage by amplifying the input signal voltage IN by an amplification factor G, and supplying the lift voltage through a lift capacitor to the line driver. The corresponding driving current is thus provided through the electric discharge from the lift capacitor (311).

As shown in FIG. 20, a portion of the input signal voltage IN below the input threshold voltage LFT$_{in}$ may be clipped before or after the amplification in accordance with one embodiment of the present invention. By clipping the input signal voltage IN, the lift. voltage is prevented from going below a predetermined voltage when the lift voltage is generated using a lift amplifier of Class-AB type. The lift amplifier may be supplied with the lift amplifier supply voltage equal to or smaller than the fixed supply voltage.

In accordance with one embodiment of the present invention, the lift capacitor is charged outside the lifting operation (315) so as to make up the electric charge lost during the lift operation. By this charging operation, a voltage of a capacitor plate driven by the lift voltage is maintained at a predetermined voltage LAMIN when the input signal voltage IN is smaller than the input threshold voltage LFT$_{in}$. A clamp circuit or a switched current supply circuit may be used for the charging operation. For example, the charging may include enabling a clamp circuit coupled to the lift capacitor when the input signal voltage IN is smaller than the input threshold voltage LFT$_{in}$. The clamp circuit charges the lift capacitor until the capacitor plate has the predetermined voltage LAMIN. Alternatively, the charging may include providing a switched current supply, and electrically connecting the current supply to the lift capacitor when a voltage of the capacitor plate is greater than the predetermined voltage LAMIN and the input signal voltage IN is smaller than the input threshold voltage.

In accordance with one embodiment of the present invention, the input threshold voltage LFT$_{in}$ is determined so as to minimize the total power consumption in the line driver circuit. For example, when the input signal voltage IN has Discrete Multitone (DMT) patterns as used in ADSL systems, the input threshold voltage LFT$_{in}$ is about 30% of the maximum peak of the input signal voltage measured from the common mode voltage of the input signal voltage.

FIG. 21 schematically illustrates a method for dynamically controlling a dual-supply voltage for a line driver in accordance with one embodiment of the present invention. The line driver has an amplification factor (gain) G, and receives an input signal voltage IN and provides an output signal voltage (OUT) to a transmission line having a load R$_L$ via a transformer having a turns ratio of 1:n.

First, the input signal voltage IN is received (321). The input signal voltage is compared with a first input threshold voltage LFTP$_{in}$(323), and when the input signal voltage IN is below the first input threshold voltage LFTP$_{in}$, a positive driving voltage $V_{ddlift}$ having a value a first predetermined amount ($V_{diode}$) lower than a first fixed supply voltage $V_{dd}$(325) is supplied to the line driver (327). The first input threshold voltage LFTP$_{in}$ is set higher than a common mode voltage (CM) of the input signal voltage IN.

When the input signal voltage IN is above the first input threshold voltage FLTP$_{in}$, the positive driving voltage $V_{ddlift}$ is lifted so as to have a value a second predetermined amount ($V_{head}$) higher than the output signal voltage OUT (329). The peak of the lifted positive driving voltage $V_{ddlift}$ becomes greater than the first fixed supply voltage $V_{dd}$ by this lifting operation. The lift operation may include generating a positive lift voltage by amplifying the input signal voltage IN by an amplification factor G, and supplying the positive lift voltage through a lift capacitor to the line driver. The corresponding driving current is thus provided through the electric discharge from the lift capacitor (331).

The input signal voltage IN is also compared with a second input threshold voltage LFTM$_{in}$(333). The second input threshold voltage LFTM$_{in}$ is set lower than the common mode voltage of the input signal voltage IN. When the input signal voltage IN is above the second input threshold voltage LFTM$_{in}$, the line driver is supplied with a negative driving voltage $V_{sslift}$ a value the first predetermined amount ($V_{diode}$) higher than a second fixed supply $V_{ss}$(335).

When the input signal voltage IN is below the second input threshold voltage LFTM$_{in}$, the negative driving voltage $V_{sslift}$ is pulled down so as to have a value the second predetermined amount ($V_{head}$) lower than the output signal voltage OUT (337). By this pulling-down (negative lifting) operation, the peak of the negative driving voltage $V_{sslift}$ becomes lower than the second fixed supply voltage $V_{ss}$. The pulling-down operation may include generating a negative lift voltage by amplifying the input signal voltage IN by an amplification factor G, and supplying the negative lift voltage through a lift capacitor to the line driver. The corresponding negative driving current is provided by discharging the lift capacitor (339).

As shown in FIG. 21, in accordance with one embodiment of the present invention, a portion of the input signal voltage IN below the first input threshold voltage LFTP$_{in}$ may be clipped (341) when a lift amplifier of Class-AB type is used in generating the positive driving voltage $V_{ddlift}$. Similarly, a portion of the input signal voltage IN above the second input threshold voltage LFTM$_{in}$ may be clipped (343) when a lift amplifier of Class-AB type is used in generating the negative driving voltage $V_{sslift}$. By clipping or limiting the input signal voltage IN for generating the positive driving voltage $V_{ddlift}$, the output of the lift amplifier is prevented from going below a predetermined voltage during the time outside the lifting operation. Similarly, by clipping or limiting the input signal voltage IN for generating the negative driving voltage $V_{sslift}$, the output of the lift amplifier is prevented from going above a predetermined voltage during the time outside the pull-down operation.

In accordance with one embodiment of the present invention, the lift capacitor for the positive driving voltage $V_{ddlift}$ is charged outside the lift operation so as to make up the electric charge lost during the lift operation. By this charging operation, a voltage of a capacitor plate driven by the positive lift amplifier is maintained at a predetermined voltage LAMINP when the input signal voltage IN is smaller than the first input threshold voltage LFTP$_{in}$(345). Similarly, the lift capacitor for the negative driving voltage $V_{sslift}$ is charged outside the pull-down operation so as to replace the electric charge lost during the pull-down operation. By this charging operation, a voltage of a capacitor plate driven by the negative lift amplifier is maintained at a predetermined voltage LAMINM when the input signal voltage IN is greater than the second input threshold voltage LFTM$_{in}$ (347).

Clamp circuits or switched current supply circuits may be used for the charging/discharging operation. For example, the charging may include enabling a clamp circuit coupled to the lift capacitor when the system is not conducting the lift/pull-down operation. The clamp circuit charges the lift capacitor until the capacitor plate has the predetermined voltage LAMINP or LAMINM. Alternatively, the charging may include providing a switched current supply, and electrically connecting the current supply to the lift capacitor when the system is not conducting the lift/pull-down operation.

The output stage of a line driver typically includes an n-type semiconductor device or NMOS-FET. Such an n-type transistor is typically formed on a p-type semiconductor substrate biased at the second (i.e., negative) fixed supply voltage $V_{ss}$. In order to prevent a parasitic diode between an output node of the transistor and the substrate from turning on during the lift operation, a special process is employed to form a specific well structure in accordance with one embodiment of the present invention. As shown in FIG. 22, by this process, an n-type well is provided in the semiconductor substrate (351), a p-type well is placed within the n-type well (353), and a transistor is formed on the p-type well (355). With this specific well structure, the substrate is biased at the negative supply voltage $V_{ss}$(357), and the n-type well is biased at the first fixed supply voltage $V_{ss}$ (359) in order to isolate the p-type well from the substrate. The p-type well is biased at the negative driving voltage $V_{sslift}$(361), and the output signal voltage of the line driver is output via the transistor (363). Since the negative driving voltage $V_{sslift}$ is always below the output signal voltage of the line driver, the parasitic diode between the output node and the p-well is prevented from turning on.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A dynamic supply control circuit for a line driver having an amplification factor G, the line driver receiving an input signal voltage and driving a transmission line having a load $R_L$ via a transformer having a turns ratio of 1:n, said circuit comprising:

an input node for receiving an input signal voltage;

a supply node for supplying a driving voltage to the line driver;

a lift diode coupled between a fixed supply voltage and said supply node;

a lift capacitor coupled between said supply node and an output node; and a lift amplifier having the amplification factor G coupled between said input node and said output node, said lift amplifier driving said lift capacitor when the input signal voltage is greater than an input threshold voltage, said input threshold voltage having a value greater than a common mode voltage of the input signal voltage.

2. The dynamic supply control circuit according to claim 1, wherein said lift amplifier is supplied with a lift amplifier supply voltage equal to said fixed supply voltage.

3. The dynamic supply control circuit according to claim 1, wherein said lift amplifier is supplied with a lift amplifier supply voltage smaller than said fixed supply voltage.

4. The dynamic supply control circuit according to claim 1, wherein said lift amplifier has the same delay as that of the line driver.

5. The dynamic supply control circuit according to claim 1, further comprising:
   a limiter circuit coupled between said input node and said lift amplifier, said limiter circuit clipping the input signal voltage below said input threshold voltage.

6. The dynamic supply control circuit according to claim 1, wherein said lift amplifier is of Class-A type having a limited current sink capability.

7. The dynamic supply control circuit according to claim 1, further comprising:
   a charger circuit coupled to said output node, said charger circuit charging said lift capacitor so that said output node is maintained at a predetermined voltage when the input signal voltage is smaller than said input threshold voltage.

8. The dynamic supply control circuit according to claim 7, wherein said input threshold voltage is determined so as to minimize a total power consumption of said dynamic supply control circuit and said line driver.

9. The dynamic supply control circuit according to claim 8, wherein said input signal voltage has Discrete Multitone (DMT) patterns, and said input threshold voltage (LFT/G) is about 30% of the maximum peak of said input signal voltage measured from the common mode voltage of said input signal voltage.

10. The dynamic supply-control circuit according to claim 7, wherein said charger circuit includes:
    a clamp circuit having an output and a first input coupled to said output node, and a second input coupled to said predetermined voltage; and
    an enable circuit coupled to said input node and said clamp circuit, said enable circuit activating said clamp circuit when the input signal voltage is smaller than said input threshold voltage.

11. The dynamic supply control circuit according to claim 7, wherein said charger circuit includes:
    a current supply; and
    a switching circuit coupling said current supply to said output node, said switching circuit electrically connecting said current supply to said output node when a voltage of said output node is greater than said predetermined voltage and said input signal voltage is smaller than said input threshold voltage.

12. A dynamic supply control circuit for a line driver having an amplification factor G, the line driver receiving an input signal voltage and driving a transmission line having a load $R_L$ via a transformer having a turns ratio of 1:n, said circuit comprising:
    an input node for receiving an input signal voltage;
    a first supply node for supplying a first driving voltage to the line driver;
    a first lift diode coupled between a first fixed supply voltage and said first supply node;
    a first lift capacitor coupled between said first supply node and a first output node;
    a first lift amplifier having the amplification factor G, coupled between said input node and said first output node, said first lift amplifier driving said first lift capacitor when the input signal voltage is greater than a first input threshold voltage;
    a second supply node for supplying a second driving voltage to the line driver;
    a second lift diode coupled between a second fixed supply voltage and said second supply node;
    a second lift capacitor coupled between said second supply node and a second output node; and
    a second lift amplifier having the amplification factor G, coupled between said input node and said second output node, said second lift amplifier driving said second lift capacitor when the input signal voltage is smaller than a second input threshold voltage.

13. The dynamic supply control circuit according to claim 12, wherein said first lift amplifier is supplied with a first lift amplifier supply voltage equal to said first fixed supply voltage, and wherein said second lift amplifier is supplied with a second lift amplifier supply voltage equal to said second fixed supply voltage.

14. The dynamic supply control circuit according to claim 12, wherein said first lift amplifier is supplied with a first lift amplifier supply voltage lower than said first fixed supply voltage, and wherein said second lift amplifier is supplied with a second lift amplifier supply voltage higher than said second fixed supply voltage.

15. The dynamic supply control circuit according to claim 12, wherein said first and second lift amplifiers have the same delay as that of the line driver.

16. The dynamic supply control circuit according to claim 12, further comprising:
    a first limiter circuit coupled between said input node and said first lift amplifier, said first limiter circuit clipping the input signal voltage lower than said first input threshold voltage; and
    a second limiter circuit coupled between said input node and said second lift amplifier, said second limiter circuit clipping the input signal voltage higher than said second input threshold voltage.

17. The dynamic supply control circuit according to claim 12, wherein said first and second lift amplifiers are of Class-A type having limited current sink and source capabilities, respectively.

18. The dynamic supply control circuit according to claim 12, further comprising:
    a first charger circuit coupled to said first output node, said first charger circuit charging said first lift capacitor so that said first output node is maintained at a first predetermined voltage when the input signal voltage is lower than said first input threshold voltage; and
    a second charger circuit coupled to said second output node, said second charger circuit charging said second lift capacitor so that said second output node is maintained at a second predetermined voltage when the input signal voltage is higher than said second input threshold voltage.

19. The dynamic supply control circuit according to claim 18, wherein said first and second input threshold voltages are determined so as to minimize a total power consumption of said dynamic supply control circuit and said line driver.

20. The dynamic supply control circuit according to claim 18, wherein said first charger circuit includes:
    a first clamp circuit having an output and a first input coupled to said first output node, and a second input coupled to said first predetermined voltage; and
    a first enable circuit coupled to said input node and said first clamp circuit, said first enable circuit activating said first clamp circuit when the input signal voltage is lower than said first input threshold voltage, and wherein said second charger circuit includes:
  a second clamp circuit having an output and a first input coupled to said second output node, and a second input coupled to said second predetermined voltage; and
  a second enable circuit coupled to said input node and said second clamp circuit, said second enable circuit activating said second clamp circuit when the input signal voltage is higher than said second input threshold voltage.

21. The dynamic supply control circuit according to claim 18, wherein said first charger circuit includes:
  a first current supply; and
  a first switching circuit coupling said first current supply to said first output node, said first switching circuit electrically connecting said first current supply to said first output node when a voltage of said first output node is higher than said first predetermined voltage and said input signal voltage is lower than said first input threshold voltage,
and wherein said second charger circuit includes:
  a second current supply; and
  a second switching circuit coupling said second current supply to said second output node, said second switching circuit electrically connecting said second current supply to said second output node when a voltage of said second output node is lower than said second predetermined voltage and said input signal voltage is higher than said second input threshold voltage.

22. A line driver circuit for coupling data signals to a transmission line having a load $R_L$ via a transformer having a turns ratio of 1:n, said line driver circuit comprising:
  an input node for receiving an input signal voltage;
  a line driver coupled to said input node, said line driver having an amplification factor G and outputting an output signal voltage to said transformer; and
  a dynamic supply control circuit including:
    a first supply node for supplying a first driving voltage to said line driver;
    a first lift diode coupled between a first fixed supply voltage and said first supply node;
    a first lift capacitor coupled between said first supply node and a first output node;
    a first lift amplifier having the amplification factor G, coupled between said input node and said first output node, said first lift amplifier driving said first lift capacitor when the input signal voltage is higher than a first input threshold voltage;
    a second supply node for supplying a second driving voltage to said line driver;
    a second lift diode coupled between a second fixed supply voltage and said second supply node;
    a second lift capacitor coupled between said second supply node and a second output node; and
    a second lift amplifier having the amplification factor G, coupled between said input node and said second output node, said second lift amplifier driving said second lift capacitor when the input signal voltage is lower than a second input threshold voltage.

23. The line driver circuit according to claim 22, wherein said first input threshold voltage is above a common mode voltage of said input signal voltage.

24. The line driver circuit according to claim 22, wherein said second input threshold voltage is below a common mode voltage of said input signal voltage.

25. The line driver circuit according to claim 22, wherein said first input threshold voltage and said second input threshold voltage are determined so as to minimize a total power consumption of said line driver circuit.

26. The line driver circuit according to claim 22, wherein said line driver includes an output stage outputting said output signal voltage to said transformer, said output stage includes an n-type semiconductor device formed on a p-type semiconductor substrate biased at said second fixed supply voltage, said n-type semiconductor device having a semiconductor structure comprising:
  an n-type well provided in said semiconductor substrate, said n-type well being biased at said first fixed supply voltage;
  a p-type well placed within said n-type well, said p-type well being biased at said second driving voltage; and
  a transistor having a gate, a drain, and a source formed on said p-type well.

27. The line driver circuit according to claim 26, wherein said line driver further includes an error amplifier including at least one n-type semiconductor device having said semiconductor structure.

28. A line driver circuit for coupling data signals to a transmission line having a load $R_L$ via a transformer having a turns ratio of 1:n, said line driver circuit comprising:
  an input node for receiving an input signal voltage;
  a first voltage supply providing a first fixed supply voltage;
  a second voltage supply providing a second fixed supply voltage;
  a line driver having an amplification factor G coupled to said input node, said line driver being supplied with a positive driving voltage and a negative driving voltage and outputting an output signal voltage to said transformer;
  a first dynamic supply controller coupled to said input node and to said line driver, said first dynamic supply controller maintaining said positive driving voltage a first predetermined amount below said first fixed supply voltage when said output signal voltage is below a first output threshold voltage, lifting said positive driving voltage a second predetermined amount above said output signal voltage when said output signal voltage rises above said first output threshold voltage, a peak of said positive driving voltage being higher than said first fixed supply voltage; and
  a second dynamic supply controller coupled to said input node and to said line driver, said second dynamic supply controller maintaining said negative driving voltage said first predetermined amount above said second fixed supply voltage when said output signal voltage is above a second output threshold voltage, pulling down said negative driving voltage said second predetermined amount below said output signal voltage when said output signal voltage goes below said second output threshold voltage, a peak of said negative driving voltage being lower than said second fixed supply voltage.

29. The line driver circuit according to claim 28, wherein said first output threshold voltage is above a common mode voltage of said output signal voltage.

30. The line driver circuit according to claim 28, wherein said second output threshold voltage is below the common mode voltage of said output signal voltage.

31. The line driver circuit according to claim 28, wherein said first output threshold voltage and said second output threshold voltage are determined so as to minimize a total power consumption of said line driver circuit.

32. The line driver circuit according to claim 28, wherein said line driver includes an output stage outputting said output signal voltage, said output stage includes an n-type semiconductor device formed on a p-type semiconductor substrate biased at said second fixed supply voltage, said n-type semiconductor device having a semiconductor structure comprising:

- an n-type well provided in said semiconductor substrate, said n-type well being biased at said first fixed supply voltage;
- a p-type well placed within said n-type well, said p-type well being biased at said second driving voltage; and
- a transistor having a gate, a drain, and a source formed on said p-type well.

33. The line driver circuit according to claim 32, wherein said line driver further includes an error amplifier including at least one n-type semiconductor device having said semiconductor structure.

34. A line driver circuit for coupling data signals to a transmission line having a load $R_L$ via a transformer having a turns ratio of 1:n, said line driver circuit comprising:

- an input port including:
  - a first input node for receiving a first input signal voltage, and
  - a second input node for receiving a second input signal voltage;
- an output port including:
  - a first driver output node for supplying a first output signal voltage to said transformer, and
  - a second driver output node for supplying a second output signal voltage to said transformer;
- a positive voltage supply providing a first fixed supply voltage;
- a negative voltage supply providing a second fixed supply voltage;
- a first line driver having an amplification factor G, coupled between said first input node and said first driver output node, said first line driver being supplied with a first positive driving voltage and a first negative driving voltage and outputting the first output signal voltage;
- a second line driver having the amplification factor G, coupled between said second input node and said second driver output node, said second line driver being supplied with a second positive driving voltage and a second negative driving voltage and outputting the second output signal voltage;
- a first supply controller coupled to said first input node and to said first line driver, said first dynamic supply controller maintaining said first positive driving voltage a first predetermined amount below said first fixed supply voltage when said first output signal voltage is below a first output threshold voltage, lifting said first positive driving voltage a second predetermined amount above said first output signal voltage when said first output signal voltage rises above said first output threshold voltage, a peak of said first positive driving voltage being greater than said first fixed supply voltage;
- a second supply controller coupled to said first input node and to said first line driver, said second dynamic supply controller maintaining said first negative driving voltage the first predetermined amount above said second fixed supply voltage when said first output signal voltage is above a second output threshold voltage, pulling down said first negative driving voltage the second predetermined amount below said first output signal voltage when said first output signal voltage goes below said second output threshold voltage, a peak of said first negative driving voltage being lower than said second fixed supply voltage;
- a third supply controller coupled to said second input node and to said second line driver, said third dynamic supply controller maintaining said second positive driving voltage the first predetermined amount below said first fixed supply voltage when said second output signal voltage is below said first output threshold voltage, lifting said second positive driving voltage the second predetermined amount above said second output signal voltage when said second output signal voltage rises above said first output threshold voltage, a peak of said second positive driving voltage being greater than said first fixed supply voltage; and
- a fourth supply controller coupled to said second input node and to said second line driver, said fourth dynamic supply controller maintaining said second negative driving voltage the first predetermined amount above said second fixed supply voltage when said second output signal voltage is above the second output threshold voltage, pulling down said second negative driving voltage the second predetermined amount below said second output signal voltage when said second output signal voltage goes below said second output threshold voltage, a peak of said second negative driving voltage being lower than said second fixed supply voltage.

35. The line driver circuit according to claim 34, wherein said first supply controller includes:

- a first supply node for supplying said first positive driving voltage to said first line driver;
- a first lift diode coupled between said first fixed supply voltage and said first supply node;
- a first lift capacitor coupled between said first supply node and a first output node; and
- a first lift amplifier having the amplification factor G, coupled between said first input node and said first output node, said first lift amplifier driving said first lift capacitor when the first input signal voltage is greater than a first input threshold voltage, and wherein said second supply controller includes:

- a second supply node for supplying said first negative driving voltage to said first line driver;
- a second lift diode coupled between said second fixed supply voltage and said second supply node;
- a second lift capacitor coupled between said second supply node and a second output node; and
- a second lift amplifier having the amplification factor G, coupled between said first input node and said second output node, said second lift amplifier driving said second lift capacitor when the first input signal voltage is smaller than a second input threshold voltage.

36. The line driver circuit according to claim 35, further comprising:

- a first limiter circuit coupled between said first lift amplifier and said first input node, said first limiter circuit clipping the first input signal voltage below said first input threshold voltage; and
- a second limiter circuit coupled between said second lift amplifier and said first input node, said second limiter circuit clipping the first input signal voltage above said second input threshold voltage.

37. The line driver circuit according to claim 35, wherein said first supply controller further includes:
- a first charger circuit coupled to said first output node, said first charger circuit charging said first lift capacitor so that said first output node is maintained at a first predetermined voltage when the input signal voltage is lower than said first input threshold voltage,
- and wherein said second supply controller further includes:
  - a second charger circuit coupled to said second output node, said second charger circuit charging said second lift capacitor so that said second output node is maintained at a second predetermined voltage when the input signal voltage is higher than said second input threshold voltage.

38. The line driver circuit according to claim 37, wherein said first and second input threshold voltages are determined so as to minimize a total power consumption of said line driver circuit.

39. The line driver circuit according to claim 37, wherein said first charger circuit includes:
- a first clamp circuit having an output and a first input coupled to said first output node, and a second input coupled to said first predetermined voltage; and
- a first enable circuit coupled to said input node and said first clamp circuit, said first enable circuit activating said first clamp circuit when the input signal voltage is lower than said first input threshold voltage,
- and wherein said second charger circuit includes:
  - a second clamp circuit having an output and a first input coupled to said second output node, and a second input coupled to said second predetermined voltage; and
  - a second enable circuit coupled to said input node and said second clamp circuit, said second enable circuit activating said second clamp circuit when the input signal voltage is higher than said second input threshold voltage.

40. The line driver circuit according to claim 37, wherein said first charger circuit includes:
- a first current supply; and
- a first switching circuit coupling said first current supply to said first output node, said first switching circuit electrically connecting said first current supply to said first output node when a voltage of said first output node is higher than said first predetermined voltage and said input signal voltage is lower than said first input threshold voltage,
- and wherein said second charger circuit includes:
  - a second current supply; and
  - a second switching circuit coupling said second current supply to said second output node, said second switching circuit electrically connecting said second current supply to said second output node when a voltage of said second output node is lower than said second predetermined voltage and said input signal voltage is higher than said second input threshold voltage.

41. The line driver circuit according to claim 34, wherein said third supply controller includes:
- a third supply node for supplying said second positive driving voltage to said second line driver;
- a third lift diode coupled between said first fixed supply voltage and said third supply node;
- a third lift capacitor coupled between said third supply node and a third output node; and
- a third lift amplifier having the amplification factor G, coupled between said second input node and said third output node, said third lift amplifier driving said third lift capacitor when the second input signal voltage is greater than said first input threshold voltage,
- and wherein said fourth supply controller includes;
  - a fourth supply node for supplying said second negative driving voltage to said second line driver;
  - a fourth lift diode coupled between said second fixed supply voltage and said fourth supply node;
  - a fourth lift capacitor coupled between said fourth supply node and a fourth output node; and
  - a fourth lift amplifier having the amplification factor G, coupled between said second input node and said fourth output node, said fourth lift amplifier driving said fourth lift capacitor when the second input signal voltage is smaller than the second input threshold voltage.

42. The line driver circuit according to claim 41, further comprising:
- a third limiter circuit coupled between said third lift amplifier and said second input node, said third limiter circuit clipping the second input signal voltage below said first input threshold voltage; and
- a fourth limiter circuit coupled between said fourth lift amplifier and said second input node, said fourth limiter circuit clipping the second input signal voltage above said second input threshold voltage.

43. The line driver circuit according to claim 41, wherein said third supply controller further includes:
- a third charger circuit coupled to said third output node, said third charger circuit charging said third lift capacitor so that said third output node is maintained at a first predetermined voltage when the input signal voltage is lower than said first input threshold voltage,
- and wherein said fourth supply controller further includes:
  - a fourth charger circuit coupled to said fourth output node, said fourth charger circuit charging said fourth lift capacitor so that said fourth output node is maintained at a second predetermined voltage when the input signal voltage is higher than said second input threshold voltage.

44. The line driver circuit according to claim 43, wherein said first and second input threshold voltages are determined so as to minimize a total power consumption of said line driver circuit.

45. The line driver circuit according to claim 43, wherein said third charger circuit includes:
- a third clamp circuit having an output and a first input coupled to said third output node, and a second input coupled to said first predetermined voltage; and
- a third enable circuit coupled to said input node and said third clamp circuit, said third enable circuit activating said third clamp circuit when the input signal voltage is lower than said first input threshold voltage,
- and wherein said fourth charger circuit includes:
  - a fourth clamp circuit having an output and a first input coupled to said fourth output node, and a second input coupled to said second predetermined voltage; and
  - a fourth enable circuit coupled to said input node and said fourth clamp circuit, said fourth enable circuit activating said fourth clamp circuit when the input signal voltage is higher than said second input threshold voltage.

46. The line driver circuit according to claim 43, wherein said third charger circuit includes:
- a third current supply; and
- a third switching circuit coupling said third current supply to said third output node, said third switching circuit electrically connecting said third current supply to said third output node when a voltage of said third output node is higher than said first predetermined voltage and said input signal voltage is lower than said first input threshold voltage, and wherein said fourth charger circuit includes:
- a fourth current supply; and
- a fourth switching circuit coupling said fourth current supply to said fourth output node, said fourth switching circuit electrically connecting said fourth current supply to said fourth output node when a voltage of said fourth output node is lower than said second predetermined voltage and said input signal voltage is higher than said second input threshold voltage.

47. A line driver circuit for coupling data signals to a transmission line having a load $R_L$ via a transformer having a turns ratio of 1:n, said line driver circuit comprising:
- an input node including:
  - a first input node for receiving a first input signal voltage, and
  - a second input node for receiving a second input signal voltage;
- an output port including:
  - a first driver output node for supplying a first output signal voltage to said transformer, and
  - a second driver output node for supplying a second output signal voltage to said transformer;
- a first voltage supply providing a first fixed supply voltage;
- a second voltage supply providing a second fixed supply voltage;
- a first line driver having an amplification factor G, coupled between said first input node and said first driver output node, said first line driver being supplied with a positive driving voltage and a negative driving voltage and outputting the first output signal voltage;
- a second line driver having the amplification factor G, coupled between said second input node and said second driver output node, said second line driver being supplied with said positive driving voltage and said negative-driving voltage and outputting the second output signal voltage;
- a first limiter circuit coupled to said first input node, said first limiter circuit clipping the first input signal voltage below a first input threshold voltage;
- a second limiter circuit coupled to said first input node, said second limiter circuit clipping the first input signal voltage above a second input threshold voltage;
- a third limiter circuit coupled to said second input node, said third limiter circuit clipping the second input signal voltage below said first input threshold voltage;
- a fourth limiter circuit coupled to said second input node, said fourth limiter circuit clipping the second input signal voltage above said second input threshold voltage;
- a first adder coupled to said first and third limiter circuits, said first adder adding outputs of said first and third limiter circuits and outputting a positive-sum input signal voltage;
- a second adder coupled to said second and fourth limiter circuits, said second adder adding outputs of said second and fourth limiter circuits and outputting a negative-sum input signal voltage;
- a first supply controller coupled to said first adder and to said first and second line drivers, said first supply controller maintaining said positive driving voltage a first predetermined amount below said first fixed supply voltage when said positive-sum input signal voltage is substantially equal to said first input threshold voltage, lifting said positive driving voltage a second predetermined amount above either one of said first output signal voltage and said second output signal voltage when said positive-sum input signal voltage rises above said first input threshold voltage, a peak of said positive driving voltage being greater than said first fixed supply voltage; and
- a second supply controller coupled to said second adder and to said first and second line drivers, said second supply controller maintaining said negative driving voltage said first predetermined amount above said second fixed supply voltage when said negative-sum input signal voltage is substantially equal to said second input threshold voltage, pulling down said negative driving voltage said second predetermined amount below either one of said first output signal voltage and said second output signal voltage when said negative-sum input signal voltage goes below said second input threshold voltage, a peak of said negative driving voltage being lower than said second fixed supply voltage.

48. The line driver circuit according to claim 47, wherein said first supply controller includes:
- a first supply node for supplying said positive driving voltage to said first line driver and to said second line driver;
- a first lift diode coupled between said first fixed supply voltage and said first supply node;
- a first lift capacitor coupled between said first supply node and a first output node; and
- a first lift amplifier having the amplification factor G, coupled to said first adder and said first output node, said first lift amplifier driving said first lift capacitor when said positive-sum input signal voltage is greater than said first input threshold voltage.

49. The line driver circuit according to claim 48, wherein said second supply controller includes:
- a second supply node for supplying said negative driving voltage to said first line driver and to said second line driver;
- a second lift diode coupled between said second fixed supply voltage and said second supply node;
- a second lift capacitor coupled between said second supply node and a second output node; and
- a second lift amplifier coupled between said second adder and said second output node, said second lift amplifier driving said second lift capacitor when the negative-sum input signal voltage is smaller than said second input threshold voltage.

50. The line driver circuit according to claim 49, wherein said first supply controller further includes:
- a first charger circuit coupled to said first output node, said first charger circuit charging said first lift capacitor so that said first output node is maintained at a first predetermined voltage when the input signal voltage is lower than said first input threshold voltage, and wherein said second supply controller further includes:
  a second charger circuit coupled to said second output node, said second charger circuit charging said second lift capacitor so that said second output node is maintained at a second predetermined voltage when the input signal voltage is higher than said second input threshold voltage.

51. The line driver circuit according to claim 50, wherein said first and second input threshold voltages are determined so as to minimize a total power consumption of said line driver circuit.

52. The line driver circuit according to claim 50, wherein said first charger circuit includes:
  a first clamp circuit having an output and a first input coupled to said first output node, and a second input coupled to said first predetermined voltage; and
  a first enable circuit coupled to said input node and said first clamp circuit, said first enable circuit activating said first clamp circuit when the input signal voltage is lower than said first input threshold voltage,
and wherein said second charger circuit includes:
  a second clamp circuit having an output and a first input coupled to said second output node, and a second input coupled to said second predetermined voltage; and
  a second enable circuit coupled to said input node and said second clamp circuit, said second enable circuit activating said second clamp circuit when the input signal voltage is higher than said second input threshold voltage.

53. The line driver circuit according to claim 50, wherein said first charger circuit includes:
  a first current supply; and
  a first switching circuit coupling said first current supply to said first output node, said first switching circuit electrically connecting said first current supply to said first output node when a voltage of said first output node is higher than said first predetermined voltage and said input signal voltage is lower than said first input threshold voltage,
and wherein said second charger circuit includes:
  a second current supply; and
  a second switching circuit coupling said second current supply to said second output node, said second switching circuit electrically connecting said second current supply to said second output node when a voltage of said second output node is lower than said second predetermined voltage and said input signal voltage is higher than said second input threshold voltage.

54. A method for dynamically controlling a supply voltage for a line driver having an amplification factor G, the line driver receiving an input signal voltage and providing an output signal voltage to a transmission line having a load $R_L$ via a transformer having a turns ratio of 1:n, said method comprising:
  receiving the input signal voltage;
  comparing the input signal voltage with an input threshold voltage, said input threshold voltage set higher than a common mode voltage of the input signal voltage;
  supplying the line driver with a driving voltage having a value a first predetermined amount below a fixed supply voltage when the input signal voltage is smaller than said input threshold voltage; and
  lifting said driving voltage when the input signal voltage is greater than said input threshold voltage, said lifted driving voltage having a value a second predetermined amount above the output signal voltage, a peak of said lifted driving voltage being greater than said fixed supply voltage.

55. The method according to claim 54, wherein said supplying includes:
  supplying a voltage from said fixed supply voltage to said line driver through a diode.

56. The method according to claim 54, wherein said lifting includes:
  generating a lift voltage by amplifying the input signal voltage by an amplification factor G; and
  supplying said lift voltage through a lift capacitor to said line driver, an electric discharge from said lift capacitor lifting said driving voltage said second predetermined amount above the output signal voltage.

57. The method according to claim 56, wherein said generating includes:
  clipping said input signal voltage below said input threshold voltage.

58. The method according to claim 56, wherein said generating includes:
  preventing said lift voltage from going below a predetermined voltage.

59. The method according to claim 56, wherein said lift voltage is generated using said fixed supply voltage.

60. The method according to claim 56, wherein said lift voltage is generated using a lift amplifier supply voltage smaller than said fixed supply voltage.

61. The method according to claim 56, further comprising:
  charging said lift capacitor so that a voltage of a capacitor plate driven by said lift voltage is maintained at a predetermined voltage when the input signal voltage is smaller than said input threshold voltage.

62. The method according to claim 61, wherein said charging includes:
  enabling a clamp circuit coupled to said lift capacitor when the input signal voltage is smaller than said input threshold voltage, said clamp circuit charging said lift capacitor until said capacitor plate has said predetermined voltage.

63. The method according to claim 61, wherein said charging includes:
  providing a switched current supply; and
  electrically connecting said current supply to said lift capacitor when a voltage of said capacitor plate is greater than said predetermined voltage and said input signal voltage is smaller than said input threshold voltage.

64. The method according to claim 61, further comprising:
  determining said input threshold voltage so as to minimize a total power consumption in said line driver and in controlling the supply voltage of said line driver.

65. The method according to claim 64, wherein said input signal voltage has Discrete Multitone (DMT) patterns, and said input threshold voltage is about 30% of the maximum peak of said input signal voltage measured from the common mode voltage of said input signal voltage.

66. A method for dynamically controlling a dual-supply voltage for a line driver having an amplification factor G, the line driver receiving an input signal voltage and providing an output signal voltage to a transmission line having a load $R_L$ via a transformer having a turns ratio of 1:n, said method comprising:

receiving an input signal voltage;

comparing the input signal voltage with a first input threshold voltage, said first input threshold voltage being higher than a common mode voltage of the input signal voltage;

supplying the line driver with a positive driving voltage having a value a first predetermined amount lower than a first fixed supply voltage when the input signal voltage is below said first input threshold voltage;

lifting said positive driving voltage supplied to the line driver when the input signal voltage is above said first input threshold voltage, said lifted positive driving voltage having a value a second predetermined amount higher than said output signal voltage, a peak of said lifted positive driving voltage being greater than said first fixed supply voltage;

comparing the input signal voltage with a second input threshold voltage, said second input threshold voltage being lower than the common mode voltage of the input signal voltage;

supplying the line driver with a negative driving voltage having a value the first predetermined amount higher than a second fixed supply voltage when the input signal voltage is above said second input threshold voltage; and pulling-down said negative driving voltage supplied to the line driver when the input signal voltage is below said second input threshold voltage, said pulled-down negative driving voltage having a value the second predetermined amount lower than said output signal voltage, a peak of said pulled-down negative driving voltage being lower than said second fixed supply voltage.

67. The method according to claim 66, wherein said line driver includes an output stage outputting said output signal voltage, said output stage includes an n-type semiconductor device formed on a p-type semiconductor substrate biased at said second fixed supply voltage, said semiconductor device having a structure including an n-type well provided in said semiconductor substrate, a p-type well placed within said n-type well, and a transistor formed on said p-type well, said method further comprising:

biasing said n-type well at said first fixed supply voltage;

biasing said p-type well at said negative driving voltage; and outputting said output signal voltage of said line driver via said transistor.

68. An apparatus for dynamically controlling a supply voltage for a line driver having an amplification factor G, the line driver receiving an input signal voltage and providing an output signal voltage to a transmission line having a load $R_L$ via a transformer having a turns ratio of 1:n, said apparatus comprising:

means for receiving the input signal voltage;

means for comparing the input signal voltage with an input threshold voltage, said input threshold voltage set higher than a common mode voltage of the input signal voltage;

means for supplying the line driver with a driving voltage having a value a first predetermined amount below a fixed supply voltage when the input signal voltage is smaller than said input threshold voltage; and means for lifting said driving voltage when the input signal voltage is greater than said input threshold voltage, said lifted driving voltage having a value a second predetermined amount above the output signal voltage, a peak of said lifted driving voltage being greater than said fixed supply voltage.

69. The apparatus according to claim 68, wherein said means for supplying includes:

means for supplying a voltage from said fixed supply voltage to said line driver through a diode.

70. The apparatus according to claim 68, wherein said means for lifting includes:

means for generating a lift voltage by amplifying the input signal voltage by an amplification factor G; and means for supplying said lift voltage through a lift capacitor to said line driver, an electric discharge from said lift capacitor lifting said driving voltage said second predetermined amount above the output signal voltage.

71. The apparatus according to claim 70, wherein said means for generating includes:

means for clipping said input signal voltage below said input threshold voltage.

72. The apparatus according to claim 70, wherein said means for generating includes:

means for preventing said lift voltage from going below a predetermined voltage.

73. The apparatus according to claim 70, wherein said lift voltage is generated using said fixed supply voltage.

74. The apparatus according to claim 70, wherein said lift voltage is generated using a second fixed supply voltage smaller than said fixed supply voltage.

75. The apparatus according to claim 70, further comprising:

means for charging said lift capacitor so that a voltage of a capacitor plate driven by said lift voltage is maintained at a predetermined voltage when the input signal voltage is smaller than said input threshold voltage.

76. The apparatus according to claim 75, wherein said means for charging includes:

means for enabling a clamp circuit coupled to said lift capacitor when the input signal voltage is smaller than said input threshold voltage, said clamp circuit charging said lift capacitor until said capacitor plate has said predetermined voltage.

77. The apparatus according to claim 75, wherein said means for charging includes:

means for providing a switched current supply; and means for electrically connecting said current supply to said lift capacitor when a voltage of said capacitor plate is greater than said predetermined voltage and said input signal voltage is smaller than said input threshold voltage.

78. The apparatus according to claim 75, wherein said input threshold voltage is determined so as to minimize a total power consumption of said apparatus and said line driver.

79. The apparatus according to claim 78, wherein said input signal voltage has Discrete Multitone (DMT) patterns, and said input threshold voltage is about 30% of the maximum peak of said input signal voltage measured from the common mode voltage of said input signal voltage.

80. An apparatus for dynamically controlling a dual-supply voltage for a line driver having an amplification factor G, the line driver receiving an input signal voltage and providing an output signal voltage to a transmission line having a load $R_L$ via a transformer having a turns ratio of 1:n, said apparatus comprising:

means for receiving an input signal voltage;

means for comparing the input signal voltage with a first input threshold voltage, said first input threshold voltage being higher than a common mode voltage of the input signal voltage;

means for supplying the line driver with a positive driving voltage having a value a first predetermined amount lower than a first fixed supply voltage when the input signal voltage is below said first input threshold voltage;

means for lifting said positive driving voltage supplied to the line driver when the input signal voltage is above said first input threshold voltage, said lifted positive driving voltage having a value a second predetermined amount higher than said output signal voltage, a peak of said lifted positive driving voltage being greater than said first fixed supply voltage;

means for comparing the input signal voltage with a second input threshold voltage, said second input threshold voltage being lower than the common mode voltage of the input signal voltage;

means for supplying the line driver with a negative driving voltage having a value the first predetermined amount higher than a second fixed supply voltage when the input signal voltage is above said second input threshold voltage; and means for pulling-down said negative driving voltage supplied to the line driver when the input signal voltage is below said second input threshold voltage, said pulled-down negative driving voltage having a value the second predetermined amount lower than said output signal voltage, a peak of said pulled-down negative driving voltage being lower than said second fixed supply voltage.

* * * * *